United States Patent
Yuen et al.

(10) Patent No.: US 7,605,837 B2
(45) Date of Patent: Oct. 20, 2009

(54) DISPLAY SYSTEM AND METHOD

(75) Inventors: Lau Chan Yuen, Hong Kong (CN); Chi Ming Tony Chung, Hong Kong (CN)

(73) Assignee: Lao Chan Yuen, Sheung Wan (HK)

( * ) Notice: Subject to any disclaimer, the term of this patent is extended or adjusted under 35 U.S.C. 154(b) by 964 days.

(21) Appl. No.: 11/144,525

(22) Filed: Jun. 2, 2005

(65) Prior Publication Data

US 2006/0274031 A1 Dec. 7, 2006

(51) Int. Cl.
*H04N 7/14* (2006.01)
*G09G 5/00* (2006.01)

(52) U.S. Cl. .............. 348/14.16; 348/14.08; 348/14.07

(58) Field of Classification Search ... 348/14.01–14.16, 348/782–788; 345/153, 753; 351/209–210; 353/28–34; 370/260, 261; 709/204
See application file for complete search history.

(56) References Cited

U.S. PATENT DOCUMENTS

| | | | |
|---|---|---|---|
| 4,758,887 A | | 7/1988 | Engel et al. |
| 5,500,671 A | * | 3/1996 | Andersson et al. ......... 348/14.1 |
| 5,777,665 A | | 7/1998 | McNelley et al. |
| 5,953,052 A | | 9/1999 | McNelley et al. |
| 6,285,392 B1 | | 9/2001 | Satoda et al. |
| 7,136,090 B1 | * | 11/2006 | McDuffie White ....... 348/14.16 |
| 7,460,150 B1 | * | 12/2008 | Coughlan et al. ........... 348/169 |

FOREIGN PATENT DOCUMENTS

DE 43 34 814 4/1995

* cited by examiner

*Primary Examiner*—Melur Ramakrishnaiah
(74) *Attorney, Agent, or Firm*—Smith-Hill & Bedell, P.C.

(57) ABSTRACT

A display system is disclosed as including first and second visual display units (VDU's), each for displaying visual images for viewing; a first digital video camera for capturing images of a first individual viewing images displayed by the first VDU; at least second and third digital video cameras for capturing, each from a different angle, images of a second individual viewing the second VDU; in which the first digital video camera is connectable with the second VDU for transmitting the captured images to the second VDU for display; and the first VDU is connectable with either of the second and third digital video cameras for display of images captured by either of the second and third digital video cameras; means for identifying the position of the centre point between the eyes of the captured images of the first individual against a capture window of the first digital video camera; and means for selectively connecting the first VDU with the second digital video camera or the third digital video camera in accordance with the identified position of the centre point between the eyes of the first individual. A visual display apparatus is also disclosed as including a visual display unit supported by a table, the table including a closable opening; a reflector movable relative to the table between a first position in which the reflector closes the opening and a second position in which the opening is open and images displayed by the visual display unit are reflectable by the reflector for viewing; and an end of the reflector is slidably and swivellably movable relative to the table for movement between the first and second positions.

42 Claims, 26 Drawing Sheets

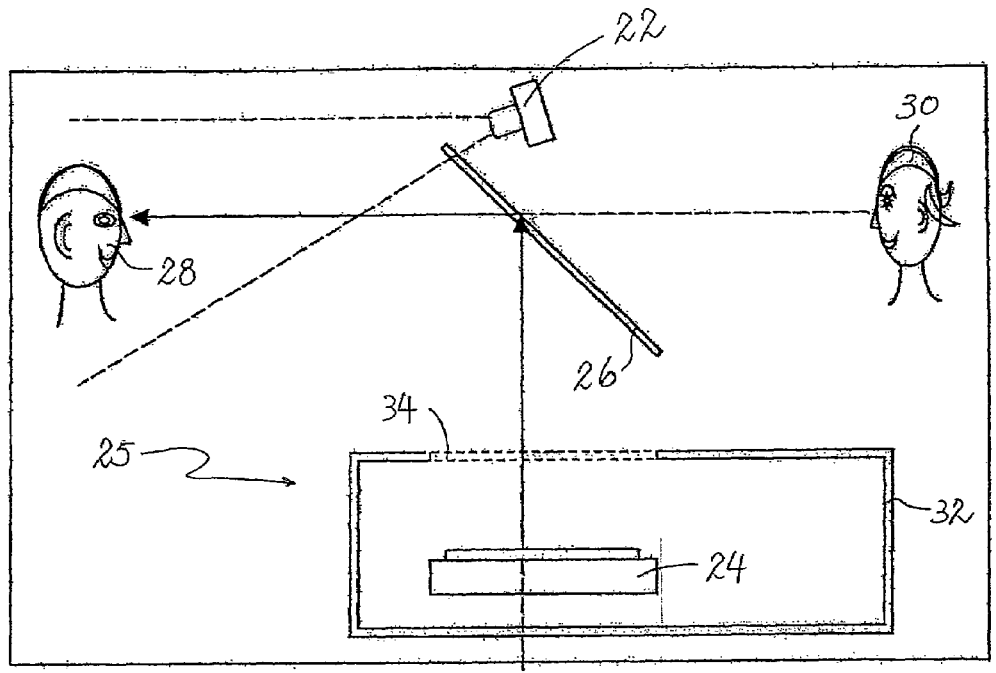
_Fig. 3A_
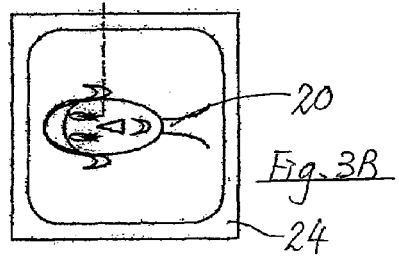
_Fig. 3B_
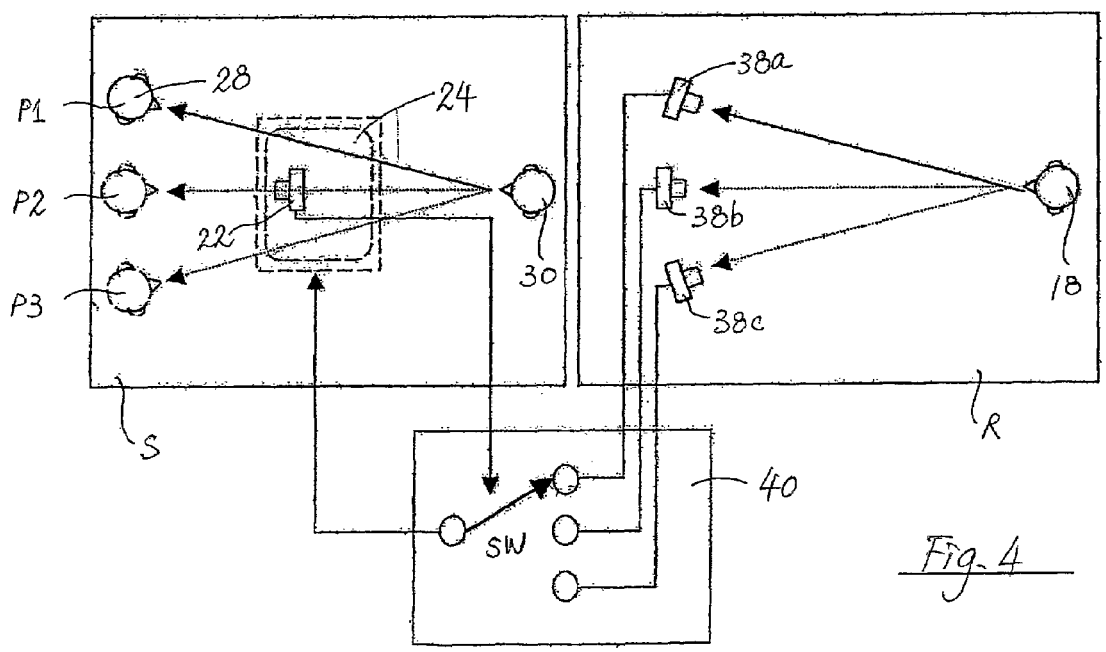
_Fig. 4_

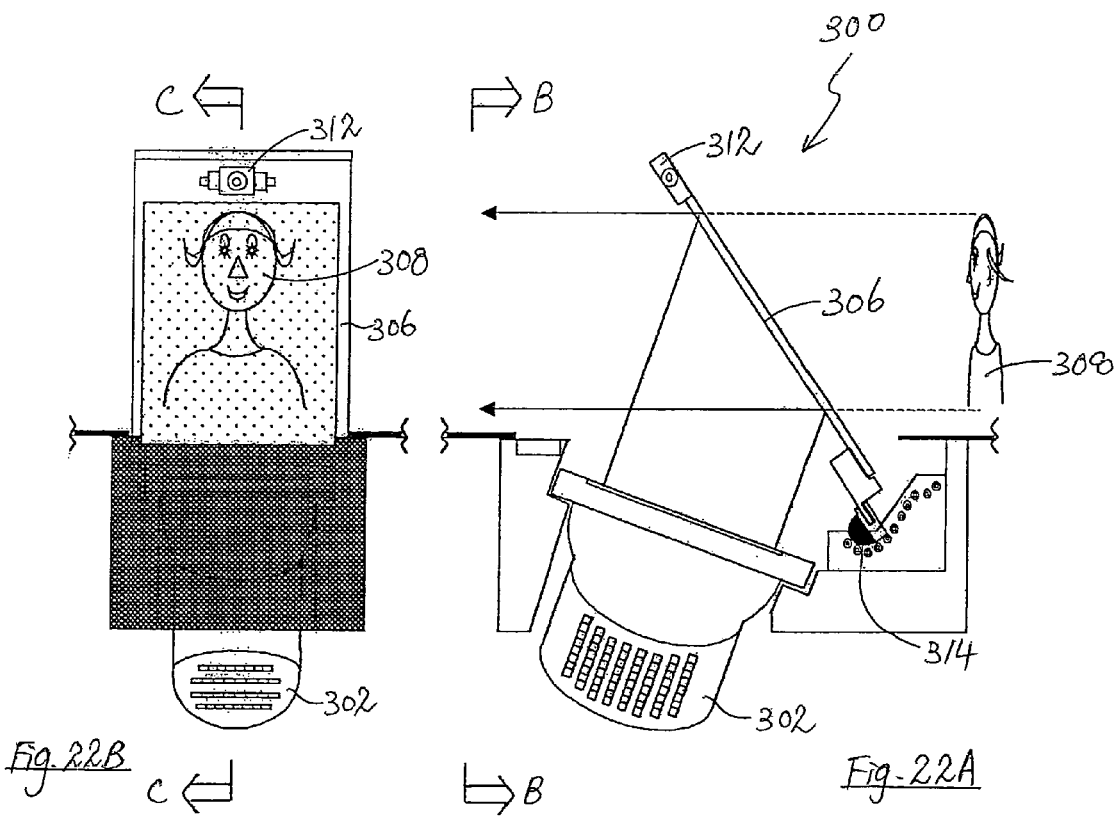
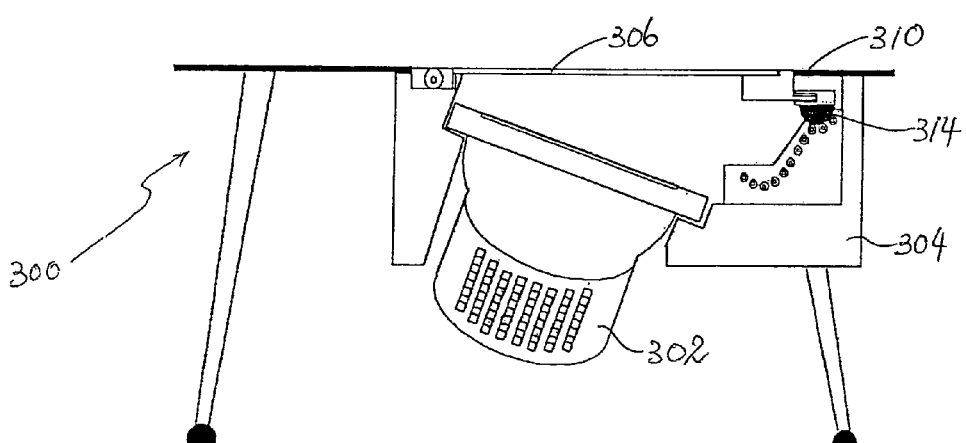
Fig. 22A
Fig. 22B
Fig. 22C 1. window closed  2. lift up first  3. rotate clockwise
4. slide down  5. further rotate  6. slide down and snap in

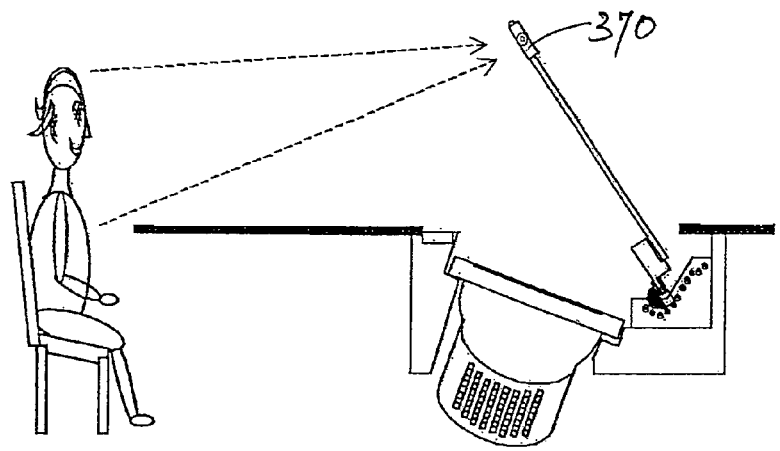
Fig. 31
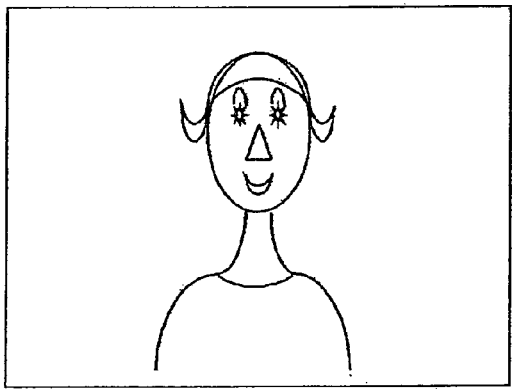
Fig. 32
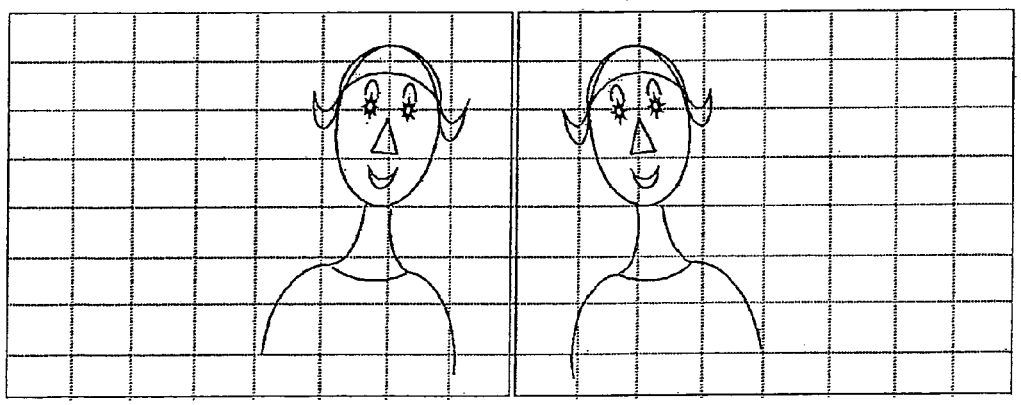
P2　　　　　　　　　　　　P3

DISPLAY SYSTEM AND METHOD

This invention relates to a display system and method, and in particular, such a system and method allowing persons at remote locations to see each other in a virtual environment.

BACKGROUND OF THE INVENTION

Face-to-face communication is the most direct and common way of communication among people. Facial expressions like eye contact, smiling, anger, and emotional gestures are all conveyed effectively through this process. However, such a process requires that the persons engaged in such communications be physically located at the same place.

With today's computer and telecommunication technologies (e.g. "NetMeeting" and "Videophone"), virtual face-to-face communication can be performed through a telecommunication channel between persons at two geographically remote locations. In such conventional systems, a video camera and a visual display unit (VDU) (e.g. a computer monitor or a television set) are placed before each of the persons engaged in the virtual communication. The video image captured by a video camera of a first party to the communication is transmitted through the telecommunication channel, for display on the VDU before a second party to the communication, and vice versa. However, in such conventional systems, a party to the communication sees his/her partner through the screen of the VDU, which is an un-human and face-to-machine system.

It is thus an object of the present invention to provide a display system in which the aforesaid shortcomings are mitigated, or at least to provide a useful alternative to the public.

SUMMARY OF THE INVENTION

According to a first aspect of the present invention, there is provided a display system including at least first and second visual display means (VDM's), each being adapted to display at least one visual image for viewing; at least a first image capturing device adapted to capture at least one image of a first individual viewing said first VDM; at least second and third image capturing devices each adapted to capture, each from a different angle, at least one image of a second individual viewing said second VDM; wherein said first image capturing device is connectable with said second VDM for transmitting said captured image to said second VDM for display; wherein said first VDM is connectable with either of said second and third image capturing devices for display of said image captured by either of said second and third image capturing devices; means for identifying the position of a reference point of the captured image of said first individual against a pre-determined reference background; and means for selectively connecting said first VDM with said second image capturing device or said third image capturing device in accordance with the position of said reference point of said first individual as identified by said identifying means.

According to a second aspect of the present invention, there is provided a display method, including the steps of (a) capturing at least one image of a first individual; (b) displaying the captured image of said first individual to a second individual; (c) capturing images of said second individual from at least a first angle and a second angle which are different from each other; (d) identifying the position of a reference point of the captured image of said first individual against a pre-determined reference background; and (e) selectively displaying the image captured from said first angle or from said second angle, in accordance with the identified position of said reference point of said first individual.

According to a third aspect of the present invention, there is provided a visual display apparatus including a visual display unit engaged with a support, said support including a closable opening; a reflector movable relative to said support between a first position in which said reflector substantially closes said opening and a second position in which said opening is open and images displayed by said visual display unit are reflectable by said reflector for viewing; wherein an end of said reflector is slidably and swivellably movable relative to said support for movement between said first and second positions.

BRIEF DESCRIPTION OF THE DRAWINGS

Preferred embodiments of the present invention will now be described, by way of examples only, with reference to the accompanying drawings, in which:

FIG. 3A is a schematic diagram of a basic arrangement in the display system according to the present invention;

FIG. 3B is a top view of the image displayed in the VDU in FIG. 3A;

FIG. 4 is a schematic diagram of the display system according to the present invention;

FIG. 22A is a partial side view of a display unit according to the present invention in an in-use configuration;

FIG. 22B is a sectional view of the display unit taken along the line B-B in FIG. 22A;

FIG. 22C is a sectional view of the display unit taken along the line C-C in FIG. 22B, with the display unit in a not-in-use configuration;

FIG. 31 shows the positioning of a viewer in front of a digital video camera forming part of the display system according to the present invention;

FIG. 32 shows various images of a viewer in the capture window by the digital video camera in FIG. 31;

DETAILED DESCRIPTION OF THE PREFERRED EMBODIMENTS

In a long-distance object-viewing situation, the viewing distance usually dominates the object's depth so that the object seems to be flat. However, in a short-distance object-viewing situation, the object's depth is dominated very much, so one can feel the object significantly by the parallax effect.

Figure 1B:
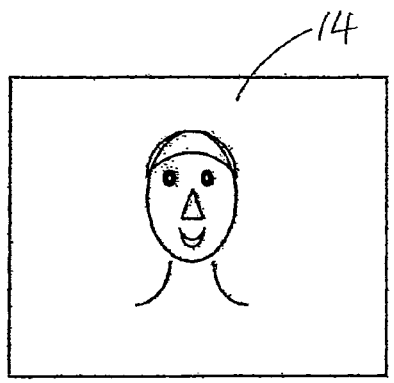
FIG. 1B is an image of the user captured by the video camera in FIG. 1, as displayed on a visual display unit (VDU)
Figure 1A:
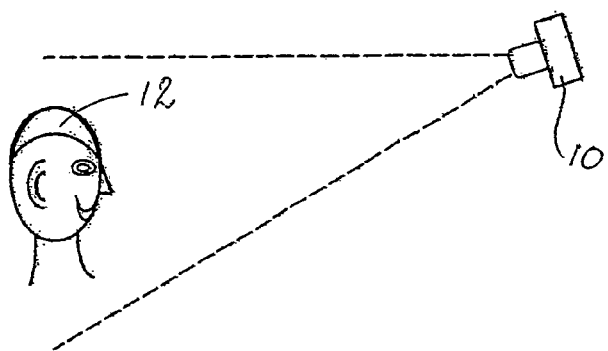
FIG. 1A shows a video camera, being part of a display system according to the present invention, monitoring a user of the system.

For example, as shown in FIGS. 1A and 1B, a video camera 10, being part of a display system according to the present invention, captures the head position of a person 12 using such a system. The captured image is displayed on a visual display unit 14, e.g. a screen of a 4:3 screen aspect ratio.

Figure 2:
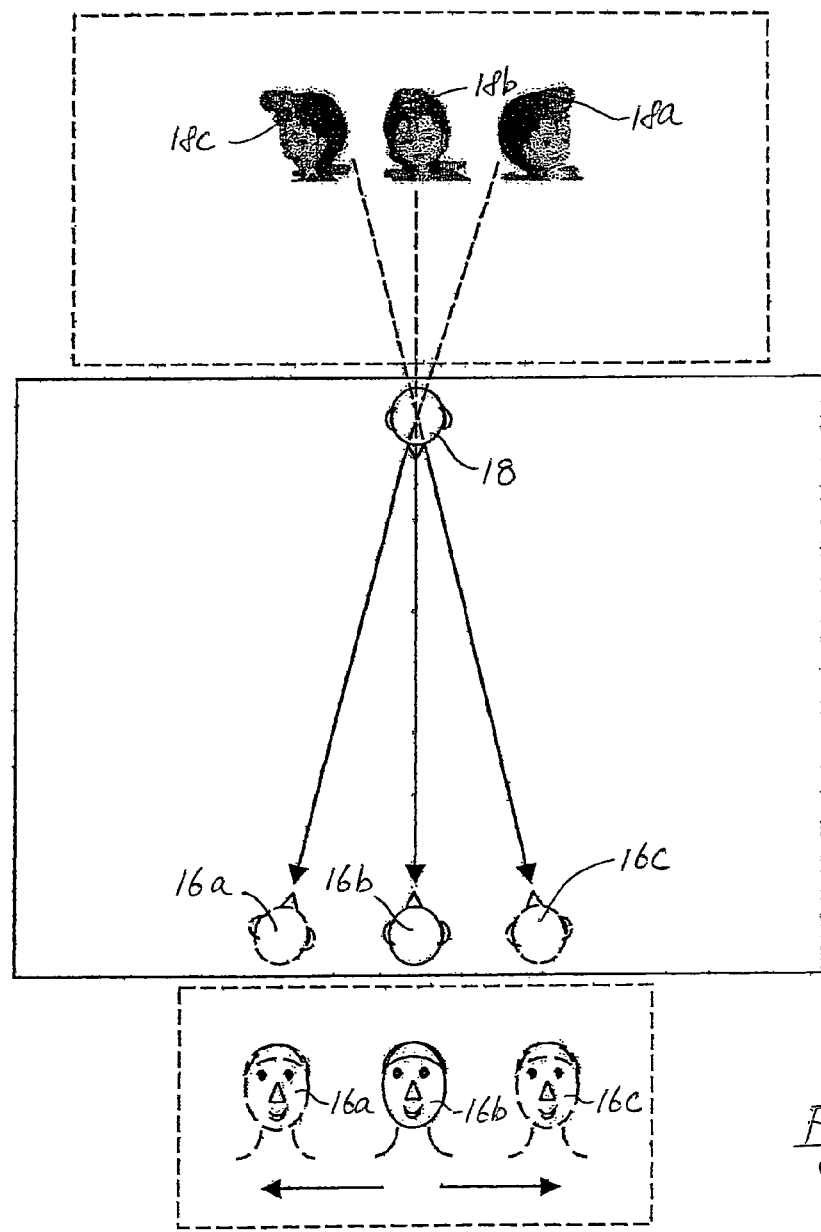
FIG. 2 shows the different views of a receptionist as perceived by a viewer at different positions and angles.

As shown in FIG. 2, when a viewer facing a female receptionist 18 moves his/her own head among the three positions 16a, 16b, 16c, he/she should see different views of the face of the receptionist 18. In particular, when at the position 16a, the viewer should see more of the right side face of the receptionist 18, as shown in 18a; when at the position 16b, the viewer should see the front view of the receptionist, as in 18b; and when at the position 16c, the viewer should see more of the left face of the receptionist 18, as shown in 18c.

FIG. 3A is a schematic diagram of a basic arrangement in a display system according to the present invention. Take an "e-Receptionist" situation, in which the image 20 of a female receptionist is transmitted for display to a viewer, the image 20 of the receptionist is displayed by a VDU 24, e.g. a monitor or a television set, forming part of a display unit 25. The image 20 displayed by the VDU 24 is reflected by a semi-transparent plate or mirror 26 positioned before a male viewer 28, and inclined at an angle, e.g. 45°, to the horizontal. By way of such an arrangement, the viewer 28 will perceive an image 30 of the receptionist (called the "virtual receptionist), as reflected by the plate 26, floating in the air, aligned with his own line of sight, and merged with the environment.

The VDU 24 is positioned within a dark enclosure 32, hidden from the line of sight of the viewer 28, and with an opening 34 allowing light from the VDU 24 to pass through. A video camera 22 is positioned above the viewer 28 for determining the head position of the viewer 28, to be discussed below.

There are several ways to determine the head position of the viewer 28. One is to use hardware ultrasonic distance measurement technique. However, problems will arise if more than one viewer are located within the capture window at the same time.

Another method is to use a video camera 22 to capture the image of the viewer 28. Before the viewer 28 approaches the system, a static background scene was recorded and stored in the reference memory of the camera 22 of the system. Objects moving in front of the camera 22 will be detected and the resultant moving images will be compared with the static background image and by simple calculations, the position of the moving object, e.g. a head of the viewer, can be determined.

In particular, we need some simple basic calculation as used in the face recognition technique for the detection and alignment process, such as multi-scale head search, face masking and contrast normalization, etc. Head search algorithm is used for finding object moving in front of the cameras; face masking algorithm is used for sending object images to reduce bandwidth requirement; and contrast normalization is used for balancing object images with the background screen.

The image data captured by the digital cameras are in the form of pixels matrix and each pixel combines three basic colour values of red, green and blue. There are two types of images to be sent from each station to the central control room, namely the active fall colour and the passive back-and-white. Normally, only one station is selected by the master receptionist at the central control room as the active full colour screen, which consumes almost half of the total 6 Mbps bandwidth, and the remaining stations will be in the mode of passive black-and-white images and share the remaining bandwidth. The ratio of bandwidth sharing determines the quality of display required. If a higher colour resolution is required, the black-and-white quality will be reduced. The basic formula to convert coloured red, green and blue values to a gray value is:

Gray value=0.3 red+0.59 green+0.11 blue

There are two pixel buffers to store the status of gray screen images. The static pixel buffer is set to remember the highest probability of gray value occurrence within a certain period of time (e.g. x seconds) and stores that value in the static buffer memory. The dynamic pixel buffer stores each pixel in memory where the probability of gray value occurrence is random within x seconds. The time duration x seconds determines the refresh rate of the system, which also depends on the available bandwidth for data transmission. The higher the bandwidth, the higher the refresh rate can be.

Once the preliminary static pixel buffer is established, the subsequently captured images will be compared with it pixel by pixel. If one pixel is found to be the same as that in the corresponding static buffer, it increases the probability of occurrence at that gray value, and the probability value is constantly updated until a constant static background image is found. The longer the time it occurs as the same gray value in that particular pixel, the higher the stability it is. Any intermittent changes in that pixel value are only regarded as noise or dynamic pixel. The whole picture image will then be sent to the master control room at a very low refresh rate to minimize the bandwidth requirement.

If one pixel is found to be different from the corresponding static buffer, its value will be stored in the dynamic buffer. With the information on area (obtained by counting the number of dynamic pixels) and shape (by pattern matching), one could predict whether the object is a human face or not. Although the prediction may not be very accurate, it is sufficient for the purpose of locating the head position. As the size of this dynamic pixel images is much smaller than the whole screen picture, it needs less bandwidth for transmission and the refresh rate can be higher.

Once the moving object with its size and shape matched with the predefined threshold values, it is assumed to be a human face looking at the camera. The static background image with very low refresh rate and the dynamic moving object image with higher refresh rate are sent separately to the central control room and combined in either one of the big screen matrix. If the required bandwidth is not enough for this purpose, the visual quality (resolution) of the moving object image may be reduced. Such will not of significant effect so long as such can be recognized by the master receptionist at the central control room as a moving human face.

Another way to further reduce the bandwidth requirement is to convert the moving object image into a very simple object shape, by eliminating all image details and keeping only the contour information. This is acceptable because this image is treated as a preview image for the purpose of selection only. An image of a higher resolution may be displayed once this particular station is chosen/designated as the active station.

With the contour of a human face, one can predict the head position with respect to the background scene and such information will be sent to the central control room for the purpose of selecting the camera for the active station. Although such a prediction depends only on the shape and contour of the human face, such will still provide sufficient information on the search of the position of the moving object without using complicated face recognition algorithms.

The camera 22 also serves as a viewing device for the viewer 28, connecting his/her image through a data link to a control room of the system, and presenting the image of the viewer 28 to a master receptionist front video wall (to be discussed below) for further manipulation.

In order to allow the viewer 28 to perceive a more realistic image of the receptionist, the size, location and face details of the virtual receptionist are preferably correlated in the same way as in presented in a real situation, although it is not strictly necessary.

The size of an adult human face is roughly the same for everybody. It is thus possible to adjusting the size of the display monitor screen so that the size of the reflected image in the air is close to the size of a human face, with the reflected image details, colour, and contrast closely resembling that of a real receptionist. The location of the reflected image can be adjusted by carefully positioning the level of the display monitor screen relative to the reflective plate. For example, if the distance between the topmost of part of the reflected image and the top of the display monitor is equal to or close to the horizontal distance between the top of the image and the reflective plate, a realistic image close to real life situation will be provided.

As shown in FIG. 4, the receptionist 18 is situate at a control room R, which is remote from a site S where the viewer 28 is located. In front of the receptionist 18 are a number of video cameras 38a, 38b, 38c, each capturing a different face image of the receptionist 18. The video cameras 38a, 38b, 38c are connected with the screen 24 via a video multiplexer 40. The camera 22 is situate at the site S for determining the position of the viewer 28.

In the situation as shown in FIG. 4, if the viewer 28 is recognized by the camera 22 to be at position P1, the switch SW of the video multiplexer 40 will connect the VDU 24 with the video camera 38a, thus allowing the 30 image of the receptionist 18 as captured by the video camera 38a to be displayed by the VDU 24. Similarly, if the viewer 28 has moved to position P3, signals detected by the video camera 22 will cause the switch SW of the video multiplexer 40 to connect the VDU 24 with the video camera 38c, whereupon the image 30 of the receptionist as displayed by the VDU 24, and thus as perceived by the viewer 28, will more of the left face of the receptionist 18.

An array of VDU's 42 (e.g. monitors or television sets) are arranged in a wall-like manner in front of the receptionist 18 in the control room R. For an example, and as shown in FIGS.

5 and 6, the VDU's 42 may be arranged as an 8×8 array, with video cameras 38 put on each intersection point. The resolution of the three-dimensional effect will be determined by the size of the array.

The image of the viewer 28 as captured by the video camera 22 will be displayed on this VDU array in either a discrete manner or in an integrated manner. As the "virtual receptionist" may be distributed for display at a number of different viewers sites S, each of the VDU's 42 may show the image of a different view viewer site S, as in FIG. 5. For an 8×8 array of VDU's 42, a maximum of sixty-four viewers can be displayed on the array at one time. If there are more than sixty-four viewer sites S, the receptionist 18 may switch a page at a time by operating on her own control panel. In the integrated mode, all the VDU's 42 forming the array may collectively show the image of one viewer site S only, as in FIG. 6.

Figure 7:
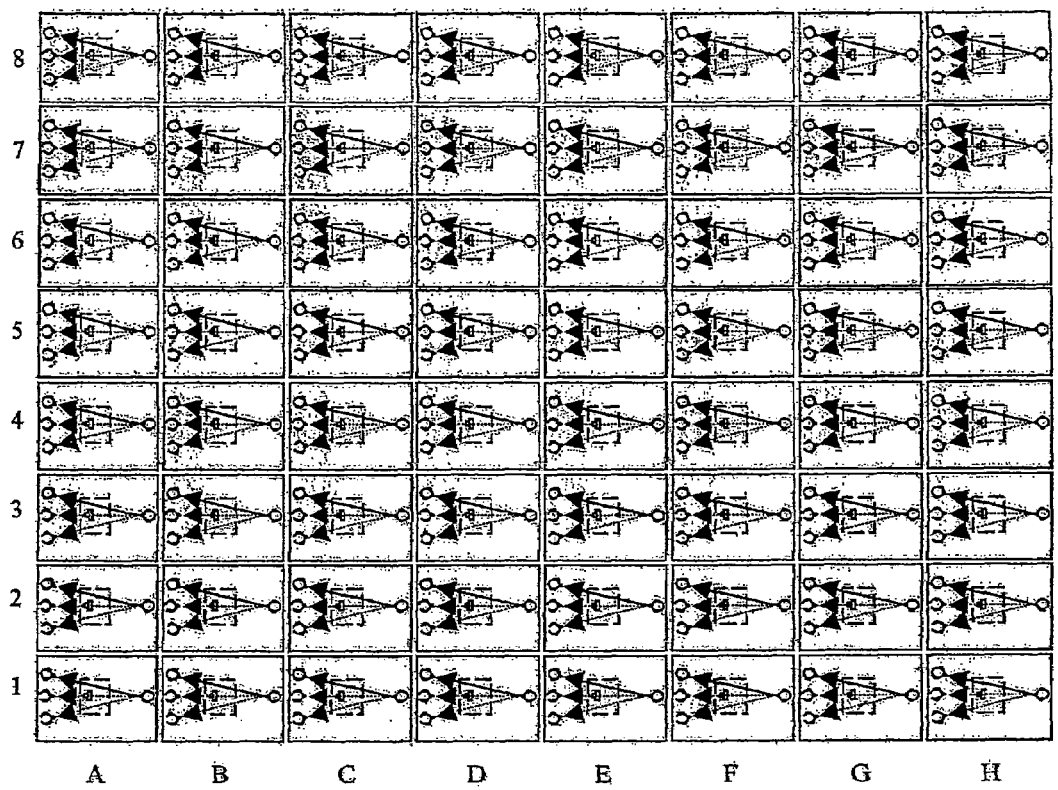
FIG. 7 shows an array of VDU's, each displaying the image of a different viewer site.

For the discrete mode of operation, each page of the viewer sites S represents the images captured by a total of sixty-four video cameras 22, each located at a different view site S. These sixty-four viewer sites S also form an 8×8 array of cameras 22, as shown in FIG. 7.

Figure 8:
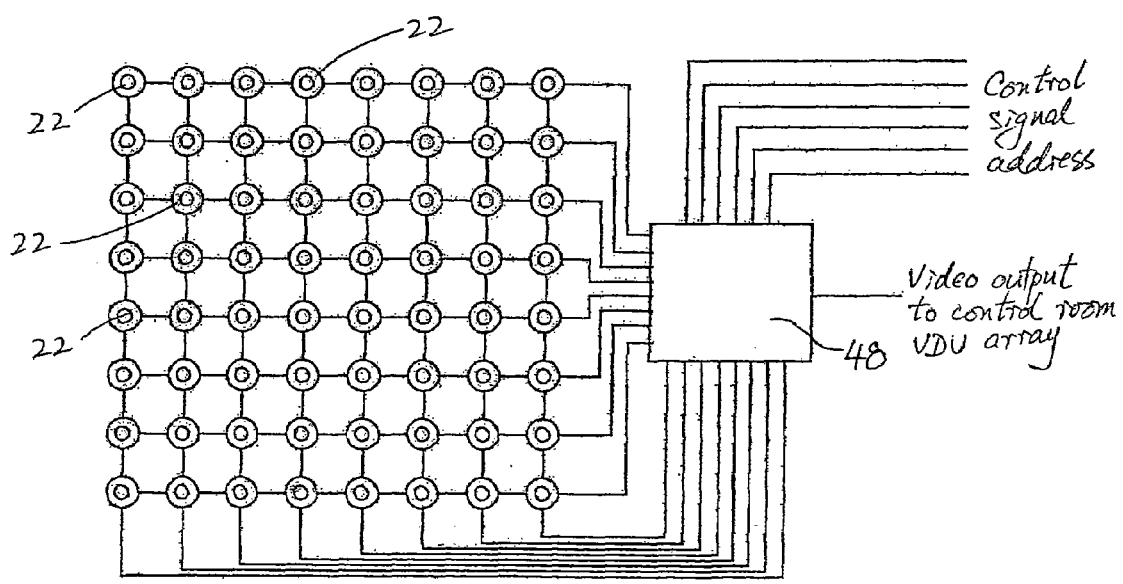
FIG. 8 shows the connection of video cameras at different viewer sites with the display system according to the present invention.

The 8×8 cameras 22 thus also form an array, as shown in FIG. 8. Video data from the cameras 22 pass through a video cross bar switch 48 to the control room R for further manipulation.

In the discrete mode of operation, to display all the images of the viewers 28, each camera 22 has to be assigned a unique identifying address, e.g. A1 to H8. It is clear that a high speed scanning mechanism is necessary in order to have a reasonable refresh rate for each VDU 42 in real time operation.

In practice, a screen update rate of down to 10 Hz is acceptable, and this means 100 mS per frame for each individual station. However, to have sixty-four stations sharing one data link channel, it requires roughly a minimum bandwidth of 200 Mbps for a 640×480×256 colour quality of display resolution and a 10:1 data compression. This calculated value could be met with the present network bandwidth of from 100 Mbps to 1 Gbps specification.

There are several ways to reduce the bandwidth requirement. Firstly, if one is willing to sacrifice the display quality in "discrete" real time mode of operation, a "priority scanning" technique can be used, for which the bandwidth may be as low as 6 Mbps. This requirement can be easily achieved in existing Internet broadband environment.

"Priority scanning" refers to the selection of only one active station for high quality display, while the rest will be handled by reduced quality algorithm to lower the bandwidth requirement. Such is an acceptable arrangement because normally there is only one receptionist 18 to handle call service or inquiry. In case viewers 28 at all sixty-four stations (viewer sites S) request service at the same time, some of the viewers 28 have to wait until service is available. By means of eye-contact between the active viewer 28 (i.e. the viewer 28 who is receiving service from the receptionist 18) and the receptionist 18, the waiting viewer 28 will note that he does not have eye-contact with the virtual receptionist. He will then realize that the receptionist 18 is serving another viewer 28, and that it is reasonable that he/she stays calm for a while until service is available to him/her.

The active station usually has the most high quality full colour display and it also serves as a cursor screen for the receptionist 18 to easily select from among the other sixty-three sets of low quality black-and-white screen displays showing the non-active stations. The maximum bandwidth requirement for one station alone is about 3 Mbps, and the remaining 3 Mbps can be shared among the remaining sixty-three stations, which is about 47.6 kbps per station, which quite enough for handling a black-and-white image with pure outline contours of human face.

Another way to reduce bandwidth requirement is to use "delta object separation" technique. As mentioned above, for each station (viewer site S), a static background was recorded and stored in the reference memory. A one-time job requires maximum bandwidth and takes the longest time to refresh the original background view for each station. After setting up the background view, if someone approaches any station, a special algorithm activates the calculation of the bitmap changes against the background scene. The result serves to locate the head of the viewer against the capture window and to send differential data stream embedded with contents of delta object information to the control room R.

The receptionist 18 in the control room R may select which one to be the active viewer. The receptionist 18 may first grasp an overview of all the stations (viewer sites S) by using the discrete mode of operation, identify if someone is approaching any station, select that particular station (viewer site S) as the active station by, e.g. rotating a control dial and pushing a button to confirm the selection. Once the active viewer is selected, the receptionist 18 may then switch the array of VDU's 42 to the integrated mode of operation. In this mode of operation, the array of VDU's 42 will combine to act as a single big display screen with each VDU 42 displaying only a portion of the active viewer's image. In this mode of operation, eye-contact can be established between the active viewer and the receptionist 18, in a manner to be discussed herebelow.

Figure 5:
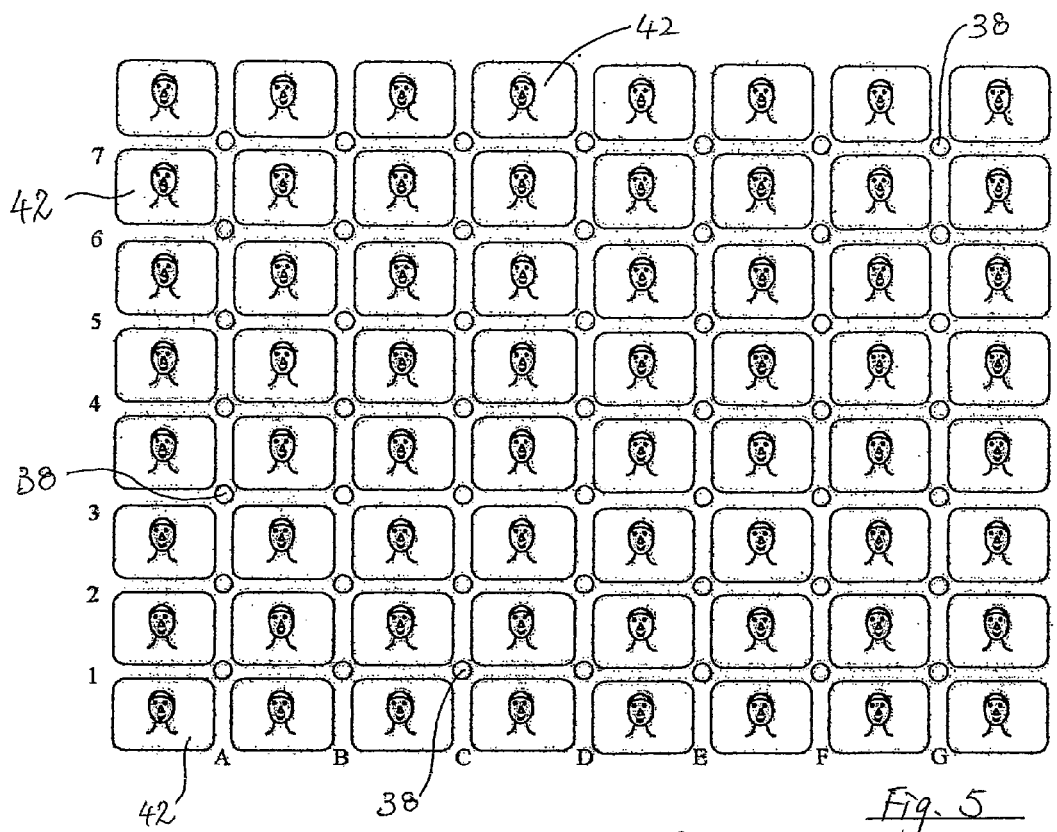
FIG. 5 shows a VDU array in front of the receptionist in a control room, in a discrete mode of operation.
Figure 6:
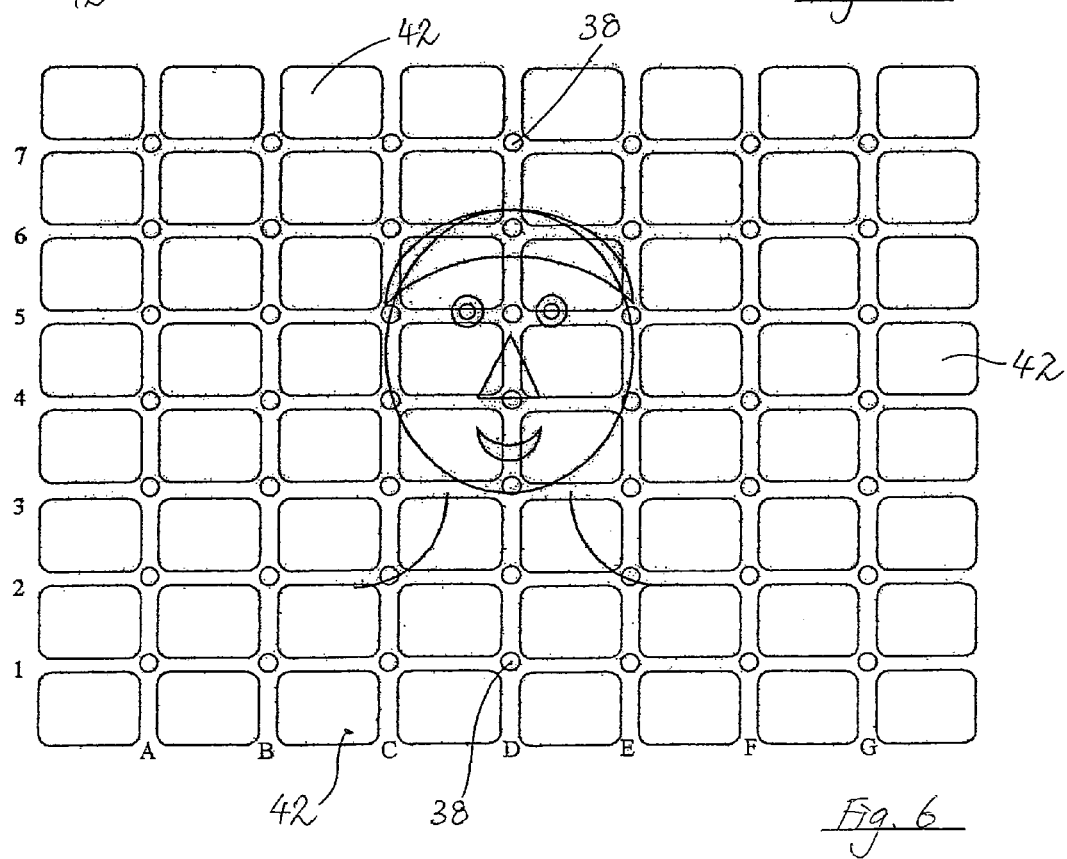
FIG. 6 shows the VDU array in FIG. 5 in an integrated mode of operation.
Figure 9:
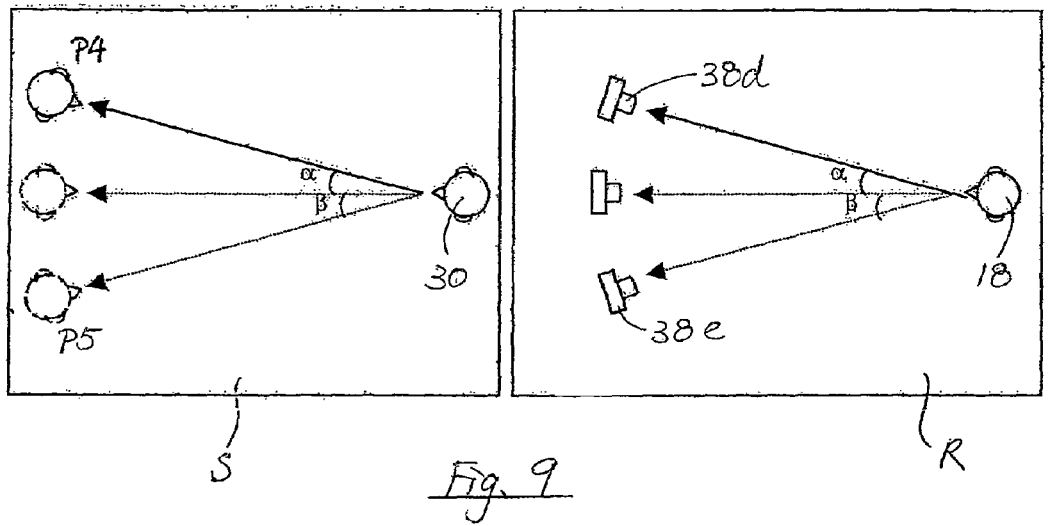
FIG. 9 shows the relationship between the positioning of the viewer in a viewer site and the positioning of video cameras in a control room.

As shown in FIGS. 5 and 6, for an 8×8 VDU array, there will be a 7×7 array of video cameras 38. These cameras 38 point at the receptionist 18 and are placed inline with the image captured. The positioning of the array of VDU's 42 and the location of the receptionist 18 should be well defined to obtain a more realistic visual effect. As shown in FIG. 9, if the viewer 28 is at the position P4 in the viewer site S, in which he looks at the virtual receptionist 30 sideway offset from the centre at an angle $\alpha$, he should see exactly the same image of the receptionist 18 in the control room R as captured by the camera 38d, which is also sideway offset from the centre of the receptionist 18 at an angle $\alpha$. Similarly, if the viewer is at the position P5 in the viewer site S, in which he looks at the virtual receptionist 30 sideway offset from the centre at an angle with the same angle $\beta$, he should see exactly the same image of the receptionist 18 in the control room R as captured by the camera 38e, which is also sideway offset from the centre of the receptionist 18 at an angle $\beta$.

Figure 10:
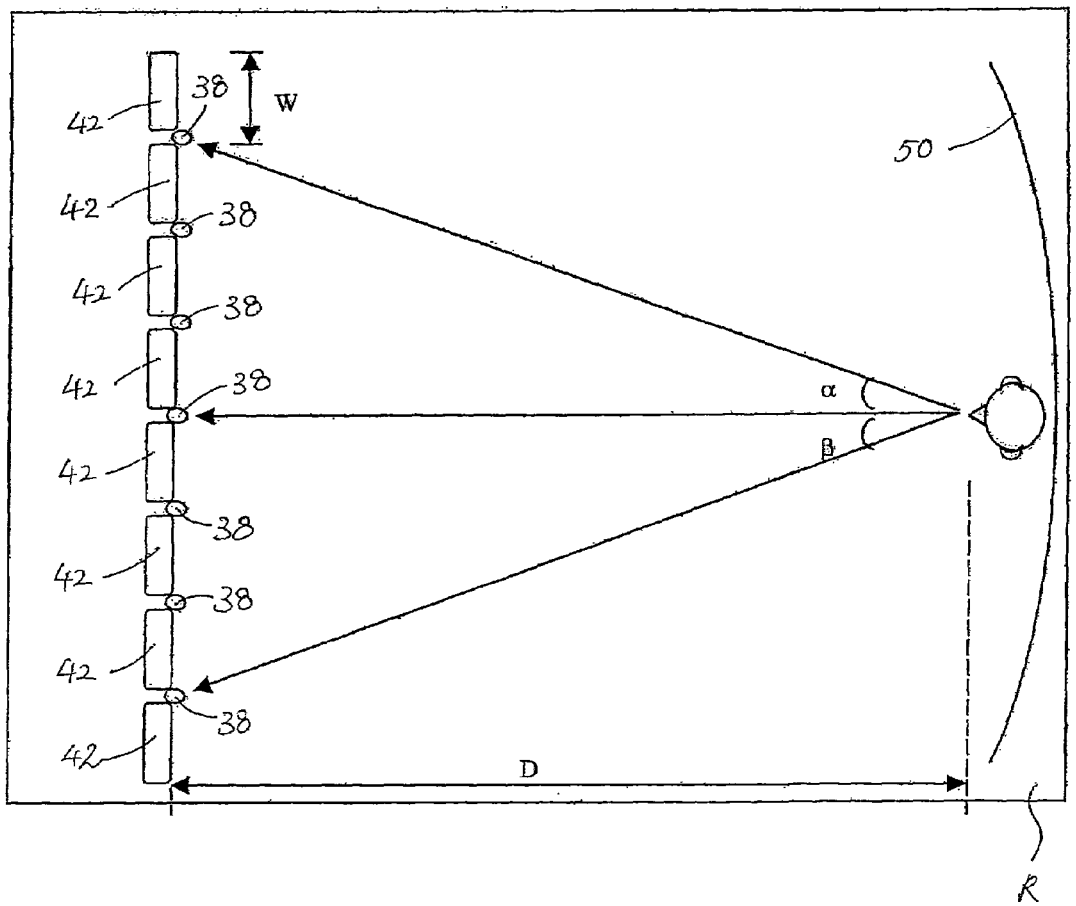
FIG. 10 shows a top view of a receptionist in front of the array of VDU's shown in FIG. 6.

As shown in FIG. 10, the receptionist 18 sits between a blue curtain 50, acting as a backdrop, and the array of VDU's 42 and the array of video cameras 38. If the receptionist 18 sits directly facing the middle column of video cameras 38, the angles $\alpha$ and $\beta$ in FIG. 10 will be the same. The distance D between the receptionist 18 and the array of VDU's 42 is given by the following formula:

$$D = \frac{3W}{\tan\alpha}$$

where W is the width of a VDU 42.

The "eye-contact point" is defined as the centre point between the two eyes of the viewer 28. In the integrated mode of operation, the image of the viewer 28 captured within the capture window will be the same as displayed on the VDU array, but with the size proportionally enlarged. It is approximately a one-to-one mapping of the captured viewer's image as displayed on the VDU array. If, during the capture of the image by the camera 22 at the viewer site S, the viewer 28 moves his head, such will be correspondingly displayed on the VDU array.

Let's assume that the receptionist 18 sits still in front of her control panel, and stays in the control room R without moving. If the viewer 28 moves his head around with his "eye-contact point" moving within the capture window, the camera 38 in the control room R which is closest to the VDU 42 displaying the viewer's eye-contact point will be connected to the active viewer's station, while its opposite image pair of "no-eye-contact point" will be displayed in all other non-active station(s). If the receptionist 18 remains seated with her head facing directly forward, the viewer 28 will see sideway left or right, up or down view of the receptionist 18.

If, on the other hand, the line of sight and head of the receptionist 18 move to follow the "eye-contact point" of the active viewer 28 as displayed on the VDU array, she will then be performing eye-contact with the active viewer 28, because no matter where the viewer 28 moves, he can see the front view of the receptionist 18, as the receptionist 18 will then be facing and looking at the camera 38 among the VDU array which is closest to the VDU 42 displaying the "eye-contact point" of the viewer 28, and it is the image captured by this particular camera 38 which is transmitted to the VDU 24 at the active viewer site S, and as perceived by the viewer 28. If the line of sight of the receptionist 18 does not follow the eye-contact point of the viewer 28, then the viewer 28 will only see a side face of the receptionist 18, depending on the direction in which the receptionist 18 moves her head.

Figure 11:
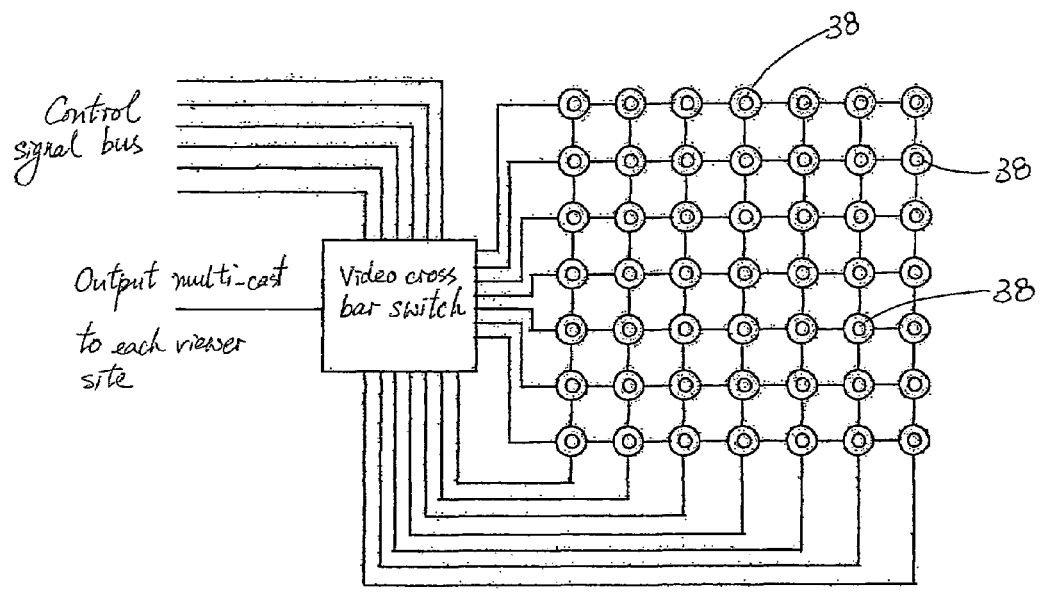
FIG. 11 shows connection of the cameras in the control room with the viewer sites.

FIG. 11 shows the connection of the cameras 38 in the control room R with the viewer sites S. The control signal addresses any one of the video camera in the 7×7 video camera array, depending on the result calculated by the head location detection algorithm described above.

As mentioned above, behind the receptionist 18 in the control room R is a blue curtain 50, which helps remove the background scene to be displayed on the VDU 24 at the viewer site S. This is important for rebuilding the virtual object image in the air through the semi-transparent plate 26. By using the "delta object separation" technique discussed above, the background scene stored in the reference memory can be separated from the object view and then only the object details are transmitted for further processing. This technique helps in reducing the bandwidth requirement, because only the needed video data are transmitted. The bandwidth required for sending the video data of the receptionist 18 from the control room R to the viewer site S is the same as that for sending the video data of the viewer 28 to the array of VDU's 42 in the control room R.

Figure 12:
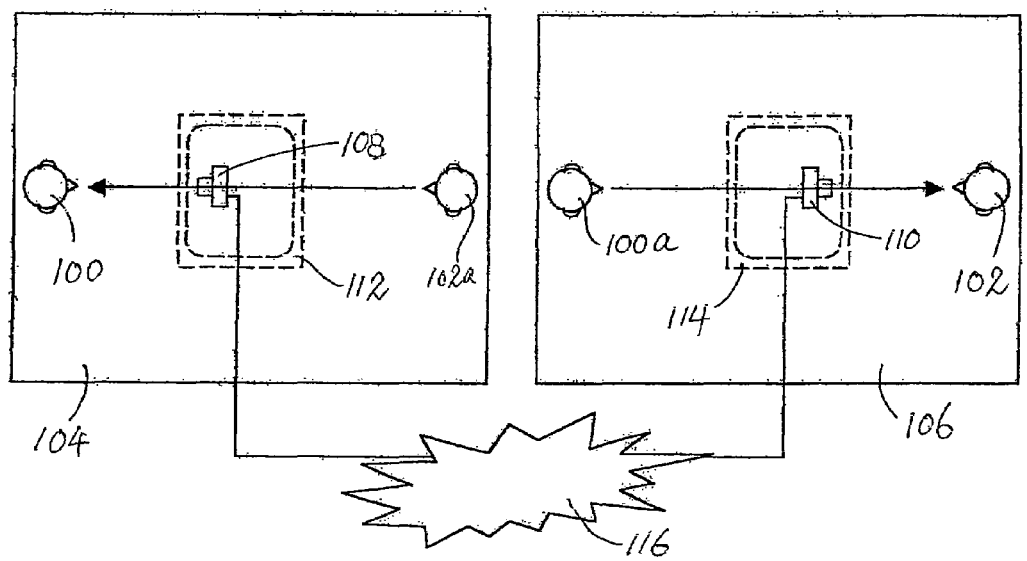
FIG. 12 is a schematic diagram of an "e-Conferencing" system according to the present invention.

In addition to "e-Receptionist", the present display system can be used for "e-Conferencing". The working principle of "e-Conferencing" is very similar to that of "e-Receptionist", except that the data communication channel is a bi-directional link instead of having separate channels for data transfer. The same "eye-contact" principle is applied here. As shown in FIG. 12, two participants 100, 102 of an e-Conference, each located at a geographically remote area 104, 106 respectively, sit before a respective camera 108, 110. In each of the area 104, 106 is also provided a respective display unit 112, 114, similar to that shown in FIG. 3A and discussed above. The cameras 108, 110 and display units 112, 114 are connected with one another via a data communication channel 116. With such an arrangement, a virtual image 102a of the participant 102 will be displayed by the display unit 112 for perception by the participant 100. Similarly, a virtual image 100a of the participant 100 will be displayed by the display unit 114 for perception by the participant 102.

Figure 13:
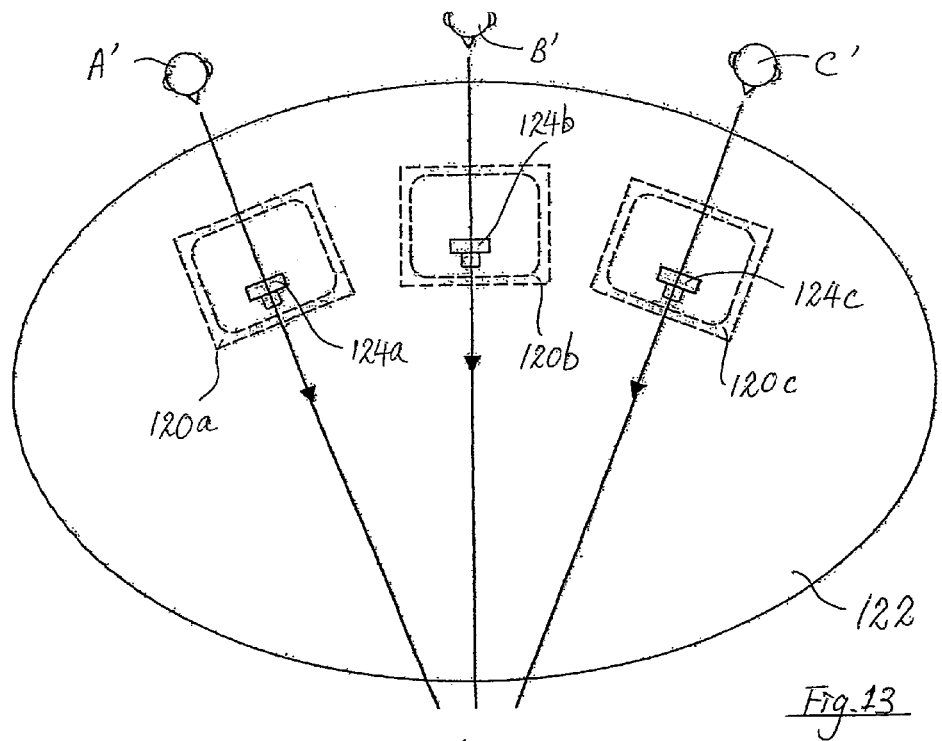
FIG. 13 shows part of an "e-Conferencing" system for four participants.

As shown in FIG. 13, in an alternative e-conference situation involving four participants, a participant D situate at a location which is geographically remote from the other three participants A, B and C, has three display units 120a, 120b, 120c installed in a table 122. Each of the display units 120a, 120b, 120c is associated with a video camera 124a, 124b, 124c directed towards D. The display unit 120a and the associated video camera 124a are connected via a data communication channel with a corresponding set of display unit and video camera before A, and similarly for participants B and C. Thus, an image of A, designated as A', will be displayed by the display unit 120a, and perceived by D; and similarly for the image B' of B and the image C' for C.

It can be seen in FIG. 13 that D is facing the video camera 124a which is connected with the display unit before the participant A. Thus, A will see the front view of D and can thus establish eye contact with D. As to B and C, as they can only see the right side face of D, as captured by the video cameras 124b and 124c respectively, they cannot establish eye contact with D. They will thus realize that D is not addressing either of them.

Figure 14:
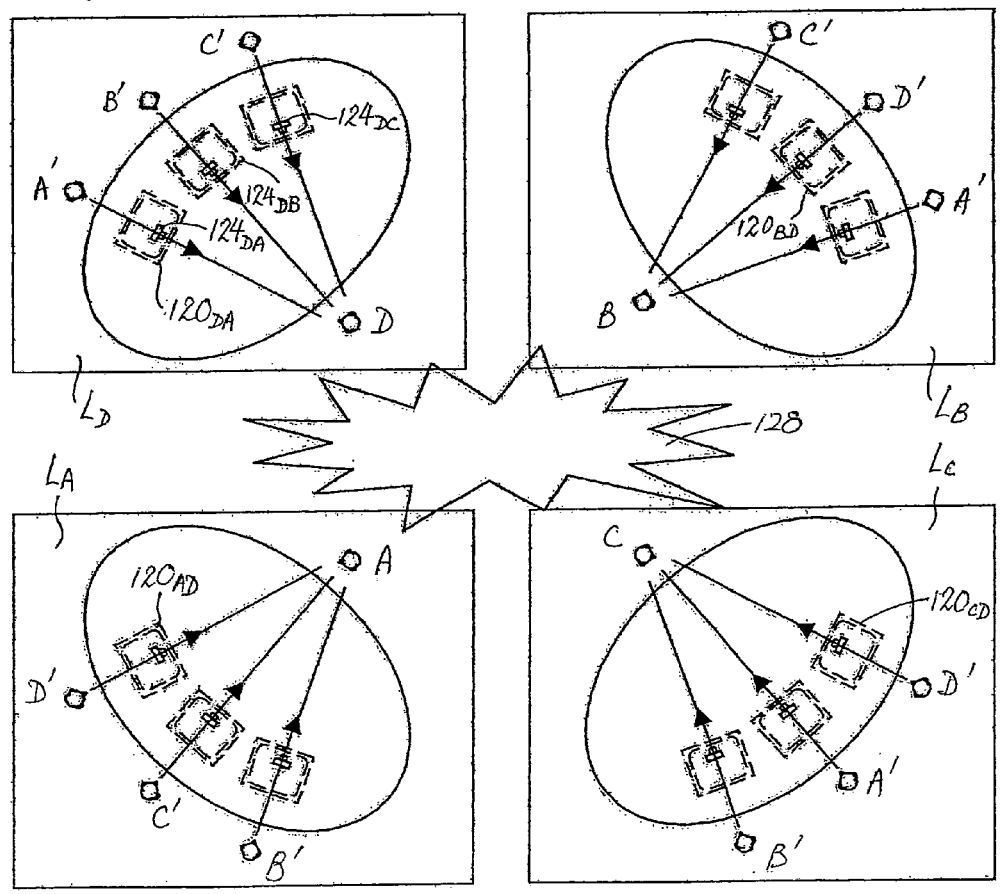
FIG. 14 is a more detailed schematic diagram of the arrangement of a four-party e-Conference using a display system according to the present invention.

FIG. 14 shows a more detailed schematic diagram of the arrangement of a four-party e-conference using a display system according to the present invention, in which parties A, B, C and D are each located at a respective location $L_A$, $L_B$, $L_C$, $L_D$, which are geographically remote from one another. As each party sits in his/her own respective location, and views the images of his/her counterparts, it is necessary to carefully organize and position the virtual parties in order to create an effective virtual environment.

As shown in FIG. 14 the various display units and video cameras are connected with one another via a data communication channel 128. A possible arrangement is shown in FIG. 14. Let's take location $L_D$ as an example. When D makes eye contact with image A' of A as displayed by the display unit $120_{DA}$, the front face of D will be captured by the associated video camera $124_{DA}$, and transmitted via the data communication channel 128, and displayed by the display unit $120_{AD}$, and perceived by A as image D'. In this scenario, as D is facing the video camera $124_{DA}$, the cameras $124_{DB}$ and $124_{DC}$ in $L_A$ will capture his right face. In $L_B$, B, through a display unit $120_{BD}$, will see an image D' of the right face of D. This coincides with the real life situation in which B will see the right side of D if D turns his/her face to speak to A. Similarly, in $L_C$, C, through a display unit $120_{CD}$, will also see an image D' of the right face of D, which coincides with the real life situation in which C will see the right side of D if D turns his/her face to speak to A. Dynamic image re-construction can be realized and the whole meeting process is satisfactorily simulated.

Figure 15A:
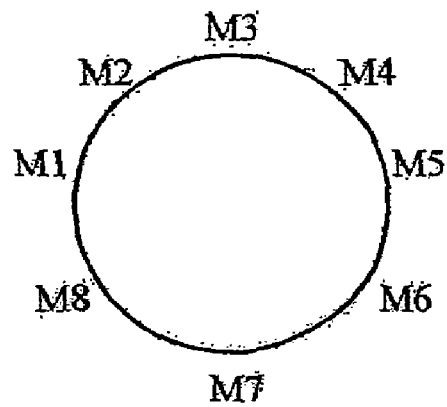
FIG. 15A shows the sitting plan of an exemplary conference.
Figure 15B:
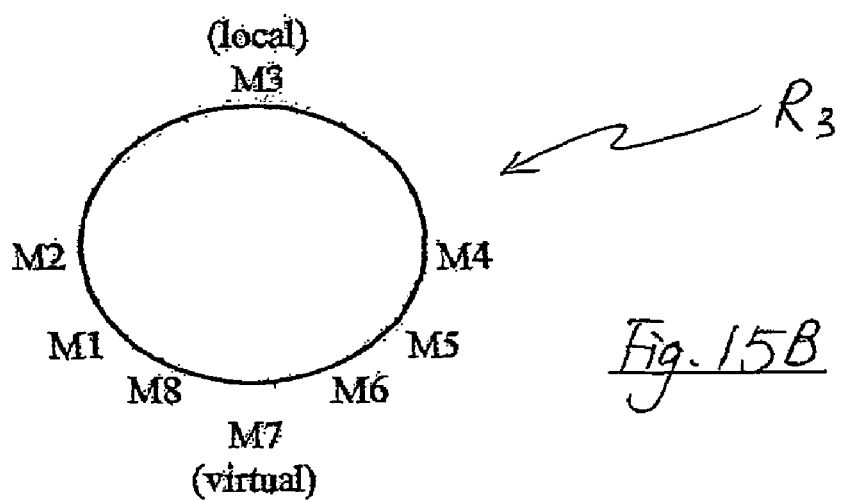
FIG. 15B shows the arrangement of the virtual participants in one room in an e-Conference simulating the sitting plan of FIG. 15A.
Figure 15C:
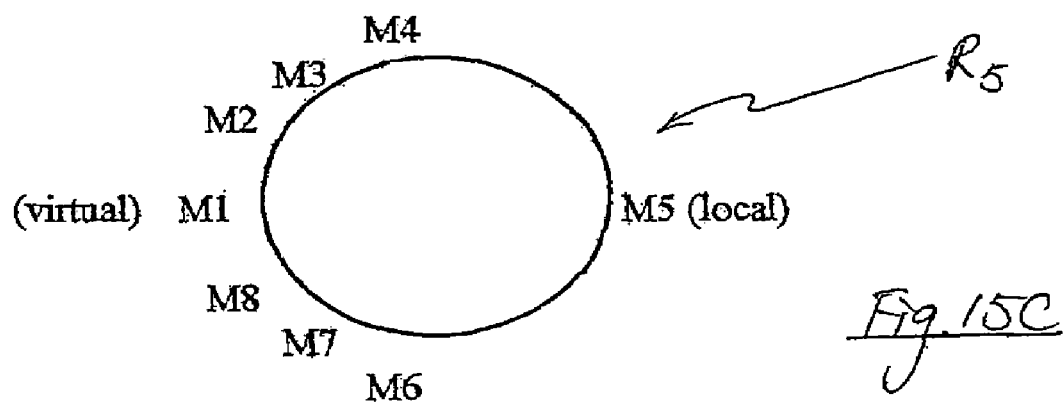
FIG. 15C shows the arrangement of the virtual participants in another room in an e-Conference simulating the sitting plan of FIG. 15A.

For e-Conferences involving more members, e.g. eight members (M1, M2, . . . M8), if it is intended to simulate the sitting plan as shown in FIG. 15A, the rule of thumb is that in each location, all the members are arranged in the same sequence around the table. Let's take room $R_3$ in which M3 is physically located, virtual M4 is to M3's left, followed by virtual M5, and so on, until back to virtual M1 and subsequently virtual M2, as shown in FIG. 15B. In this connection, virtue M5 is a display unit in $R_3$ which is connected with the video camera in room $R_5$ which is associated with a display unit in $R_5$ for display of the image of M3. Similarly, in room $R_5$ in which M5 is physically located, virtue M6 is to M5's left, followed by virtual M7, and so on, back to virtual M1 and finally having M4 to M5's right, as shown in FIG. 15C.

"Delta object separation" technique may also be employed in e-Conference to remove background scene of each individual meeting member, and thus to transmit data of the object image of the member only through the data communication channel. In addition, the basic data communication technique used for e-Conference may be the same as that used in 3G mobile phone technology. Instead of a small screen in the mobile phone, a bigger and modified display system may be used to create the virtual scene to achieve the special visual effect.

Figure 16:
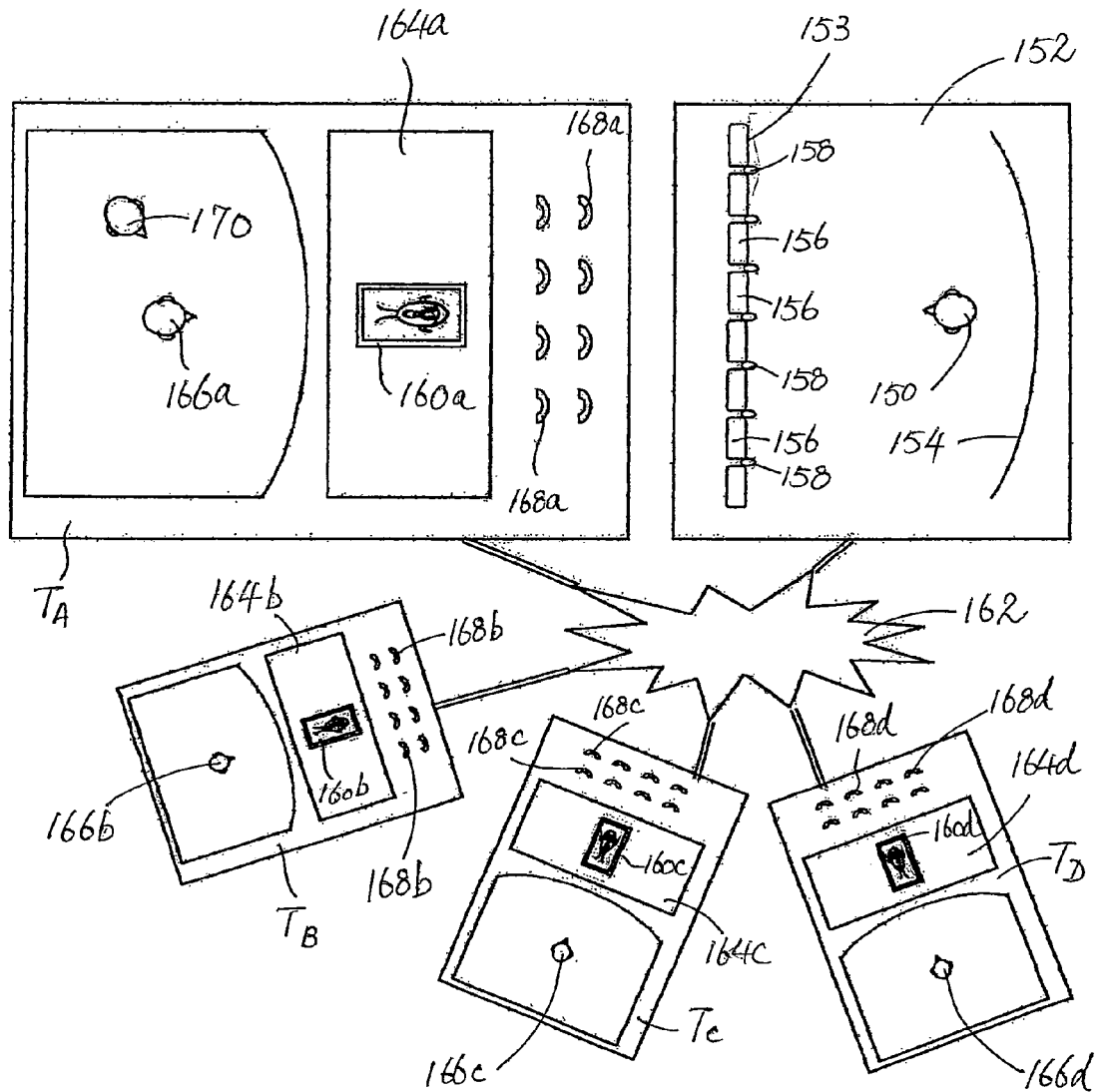
FIG. 16 is a schematic diagram of the application of a display system according to the present invention as an "e-Theatre"

A further application of a display system and method according to the present invention is the e-Theatre, which is shown schematically in FIG. 16. In this application of the invention, an artist 150 performs inside a control room 152, in front of a VDU array 153 (as discussed above) with a blue curtain 154 behind him/her. VDU's 156 in the VDU array 153 monitor the progress of various scenes on individual stage, and video cameras 158 positioned among the VDU's 156 capture the image of the artist 150, each at a different angle. Technicians may be employed to operate various panels and buttons to transmit the image of the artist 150 to various concerts at different geographically remote locations.

Let's assume that e-Theatres are held at locations $T_A$, $T_B$, $T_C$ and $T_D$. The VDU's 156 in the VDU array 153 and video cameras 158 in the control room 152 are connected display units 160a, 160b, 160c and 160d of the respective locations $T_A$, $T_B$, $T_C$ and $T_D$ via a data communication channel 162. The image of the artist 150 as displayed by the respective display unit 160a, 160b, 160c and 160d is reflected by a respective inclined semi-transparent plate 164a, 164b, 164c and 164d to form a virtual image 166a, 166b, 166c, and 166d as perceived the respective audience 168a, 168b, 168c, and 168d. An artist 170 physically present at location $T_A$ may even co-perform with the virtual image 166a of the artist 150 for the audience 168a at location $T_A$.

Figure 17:
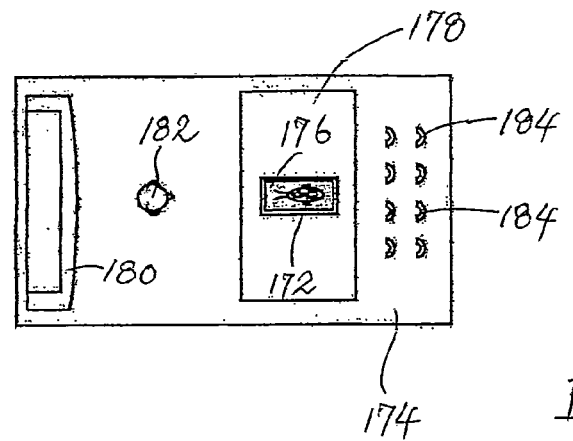
FIG. 17 is a schematic diagram of the application of a display system according to the present invention as a "Stereo Television"

A further possibility of the application of a display system according to the present invention is called "Stereo Television", as shown in FIG. 17. An image 172 of an artist geographically remote from an area 174 is displayed by a display unit 176 and reflected by an inclined semi-transparent plate 178 with a television set 180 as background. The image (virtual artist) 182 is perceived by the audience 184 to be closer to the audience than the television set 180.

Figure 18:
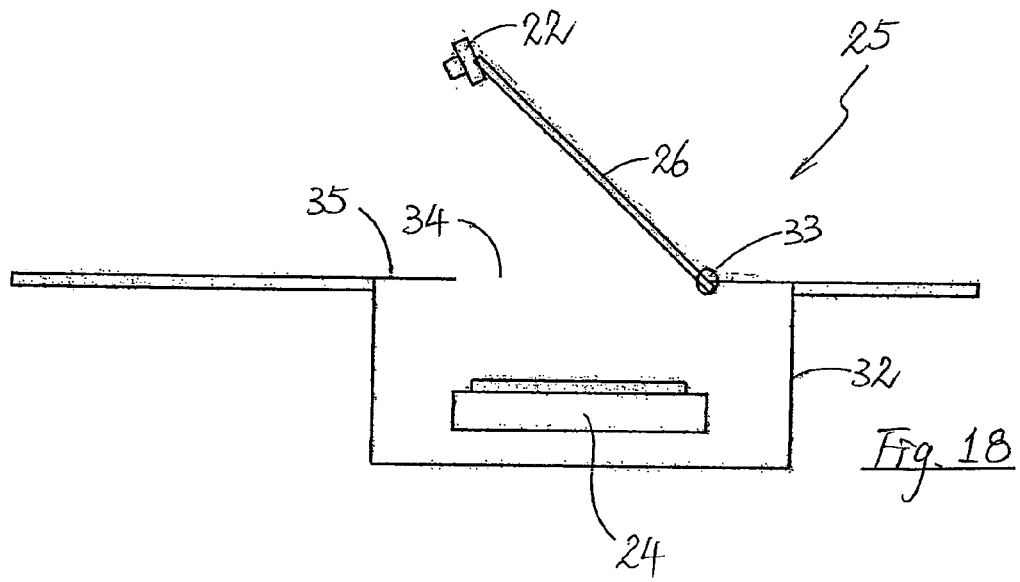
FIG. 18 is a side view of a display unit in an in-use configuration.
Figure 19:
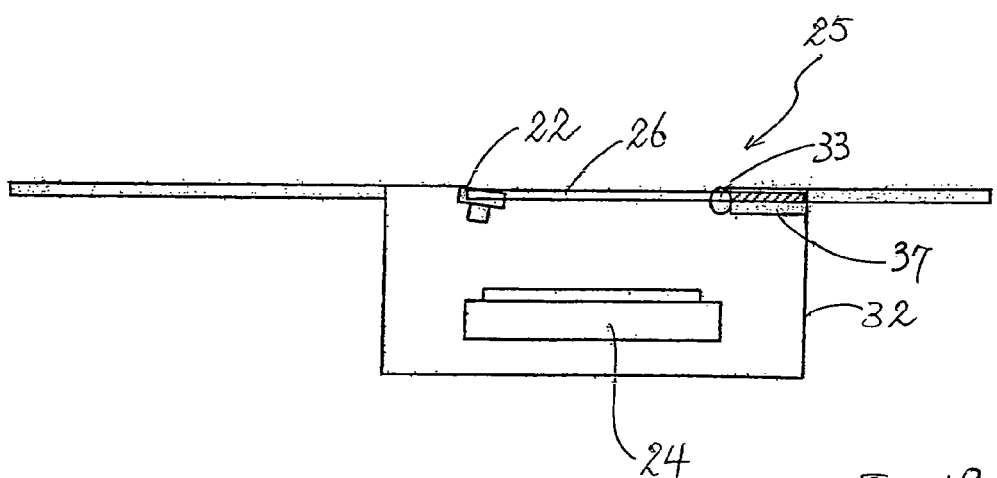
FIG. 19 is a side view of the display unit shown in FIG. 18 in a close configuration.

Turning now back to the display unit 25, first discussed in relation to FIG. 3A, it is shown in FIGS. 18 and 19 that the semi-transparent plate 26 is connected with an upper surface of the dark enclosure box 32 via a hinge 33, and thus movable to selectively open or close the box 32 by the plate 26. The video camera 22 is attached on a free end of the plate 26, and is directed downwardly towards a viewer. The angle at which the plate 26 is inclined relative to the upper surface depends on how the VDU 24 is placed beneath the opening 34 in the box 32. The angle should be such that the image projected by the VDU 24 in space should form a reasonable figure of the target image in the viewer's line of sight.

As shown more clearly in FIG. 19, the semi-transparent plate 26, which acts like a display window, is attached to a desktop 35 by a slide-in roller hinge system. When the plate 26 is not in use, the plate 26 is slid into a slot 37 near the hinge 33 to close the opening 34, whereby a flat desktop surfaced is formed for other use.

The positioning of the VDU 24 depends on the particular application of the display system. In the case of "e-Receptionist", as discussed above, a normal receptionist desk may be modified by providing a recess with a dark enclosure box within which is placed a VDU. When not in use, the opening of the dark enclosure box may be closed, and a real receptionist may sit across the receptionist desk for serving customers. As to "e-Conference", the construction is similar except that the number of recesses (and thus the number of VDU's) in the conference table will depend on the number of parties intended to be served by the system.

Turning to "e-Theatre" and "stereo Television", as the virtual artist may be positioned anywhere around the stage, or in front of the TV screen, the VDU should be designed to be movable up and down to adjust the viewing depth and, and horizontally to adjust the location of the projected image, i.e. virtual artist.

Figure 20:
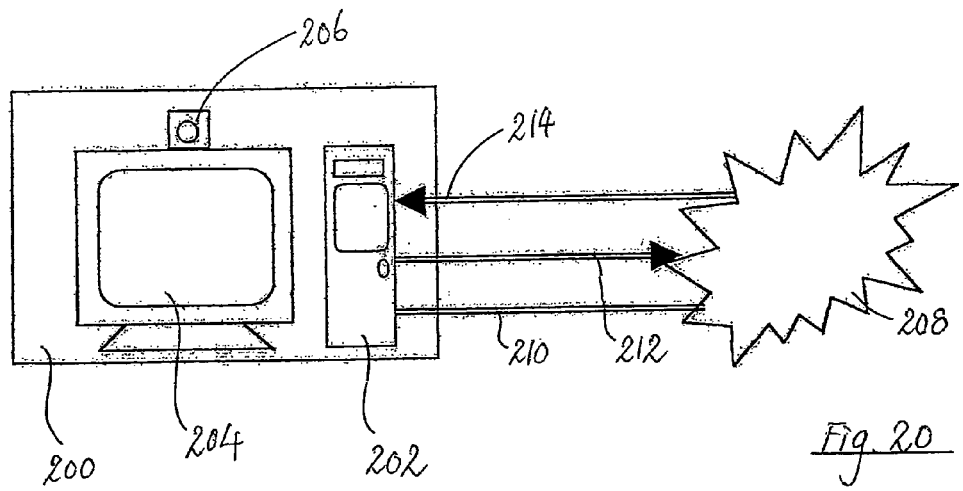
FIG. 20 is a schematic diagram of the basic hardware design of a viewer site of a display system according to the present invention.
Figure 21:
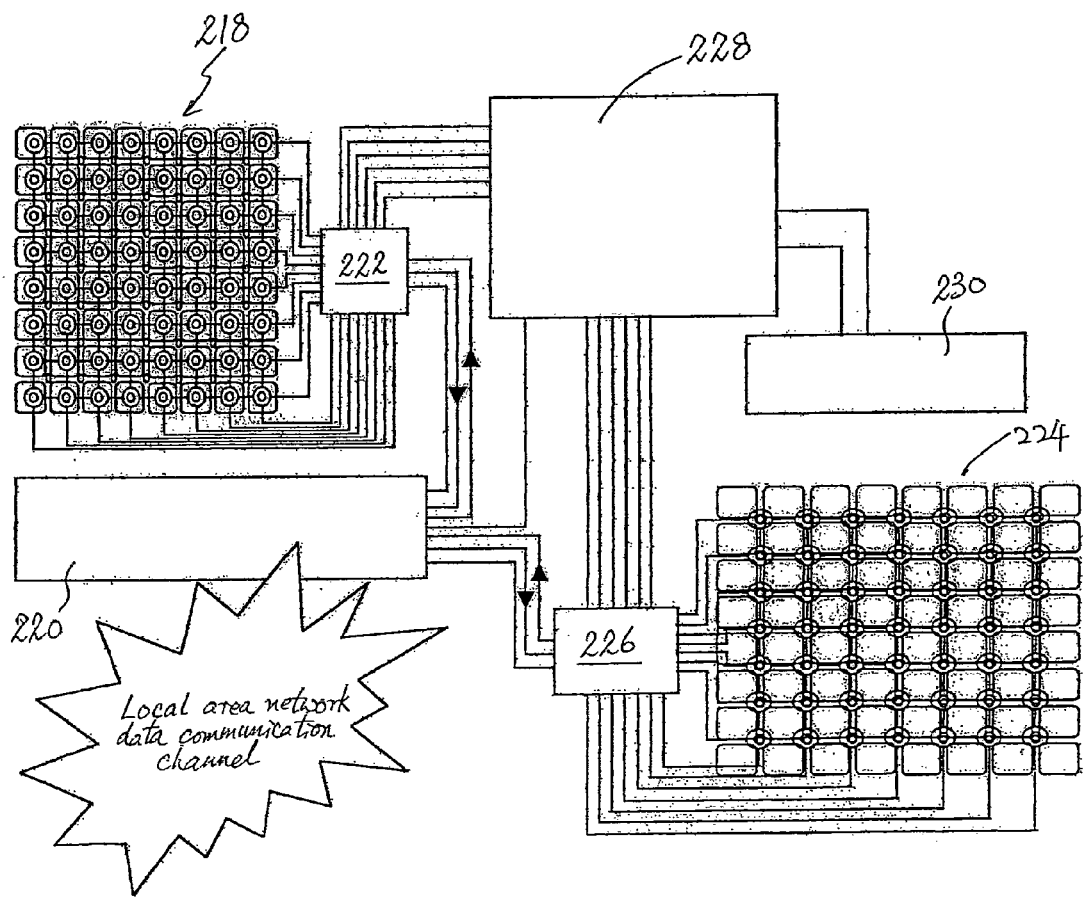
FIG. 21 is a schematic diagram of the connection of viewer sites and the control room installed in an "e-Receptionist" application of a display system according to the present invention.
Figure 22D:
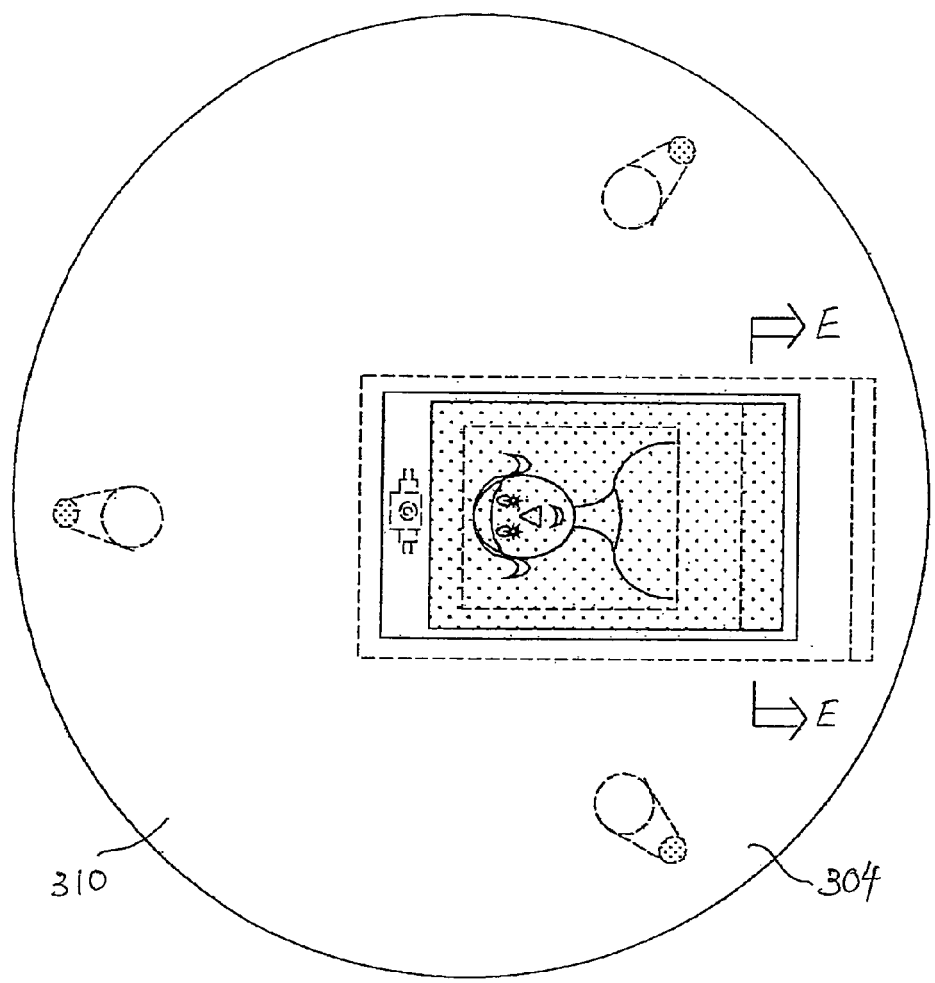
FIG. 22D is a top view of the display unit shown in FIG. 22C.
Figure 22E:
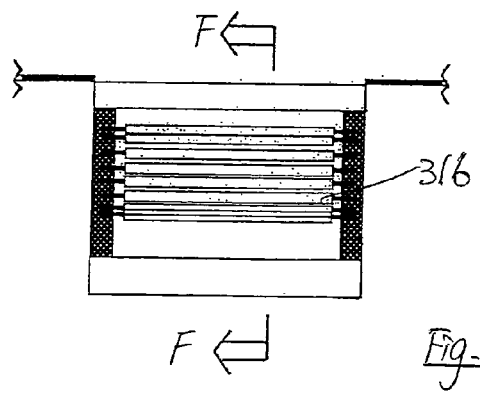
FIG. 22E is a sectional view taken along the line E-E in FIG. 22D.
Figure 22F:
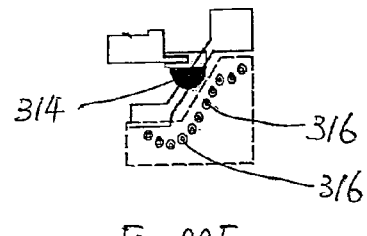
FIG. 22F is a sectional view taken along the line F-F in FIG. 22E.

As shown in FIG. 20, each viewer site 200, e.g. in an "e-Receptionist" application of a display system according to the present invention, includes a personal computer (PC) 202 with a display screen 204, attached with a digital video camera 206. The PC 202 is connected with a data communication network 208 (e.g. the Internet or intranet) via a low-speed Control+Voice trunk 210, a high-speed video-out trunk 212, a high-speed video-in trunk 214 of Local Area Network (LAN) environment. As further shown in FIG. 21, the video-in and video-out of the array of viewer's sites 218 are connected to a video network management unit 220 via a cross bar switch 222. Similarly, the video-in and video-out of the array of VDU's and cameras 224 in the control room are also connected to the video network management unit 220 via a cross bar switch 226. The cross bar switches 222, 226 are connected with a system control unit 228, which is connected with a control panel interface 230, is provided with special design control protocol for overall inter-operating system control.

FIGS. 22A to 22F show various views of an alternative display unit 300 according to the present invention. A monitor 302 is inclinedly supported in a recess of a table 304. Image displayed on the monitor 302 is projected onto a semi-transparent plate 306, to form a virtual image 308 to be perceived by an onlooker/viewer. The plate 306 is movable between an in-use position in which it is pivoted upwardly to an inclined position relative to the surface 310 of the table 304, and a not-in-use position in which it lies flush with the surface 310 of the table 304 to form a generally continuous and flush table top surface. At one longitudinal end of the plate 306 is mounted a digital video camera 312 for capturing images of the viewer, for transmission to another VDU, being part of the display system.

Figure 23:
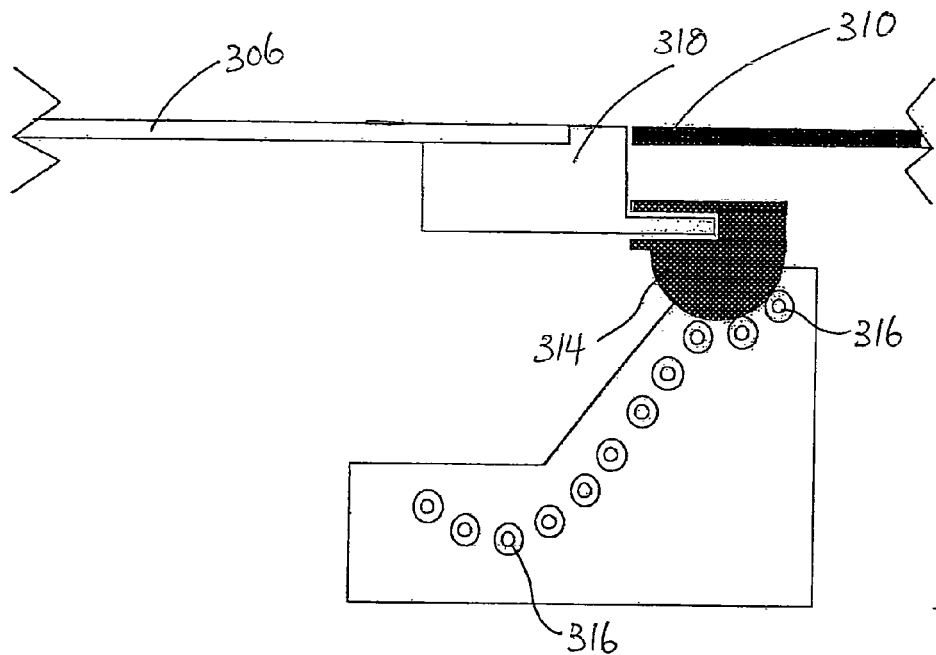
FIG. 23 is an enlarged view of the movable revolutionary joint shown in FIG. 22C, with the plate in a closed position.
Figure 24:
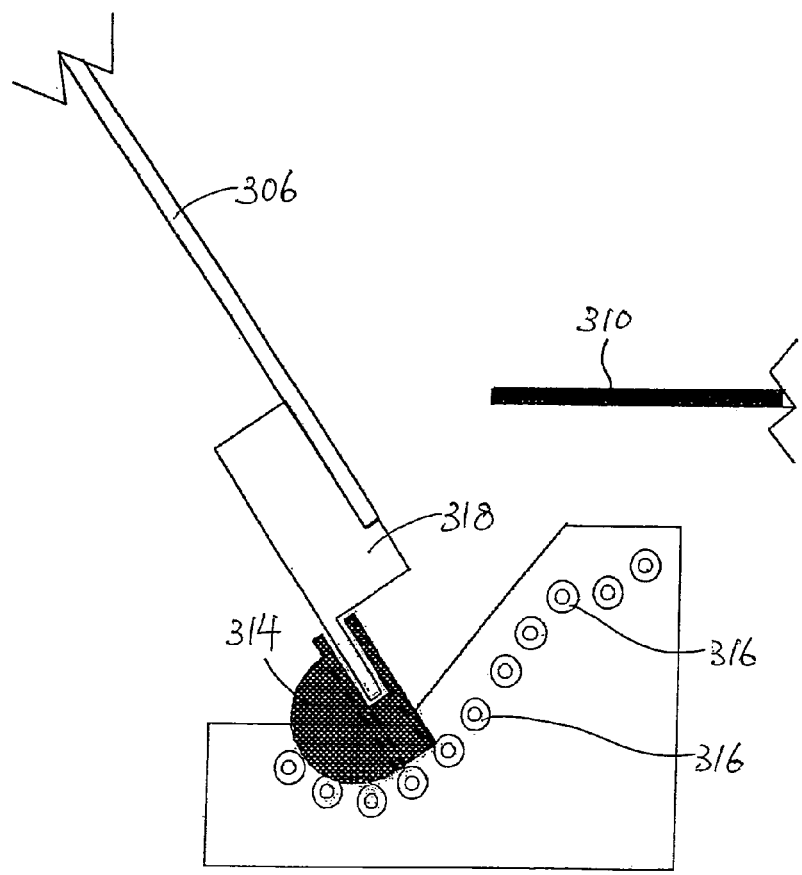
FIG. 24 is view corresponding to FIG. 23, with the plate in an open position.

As shown in FIGS. 22A, 22C, 22E and 22F, a second longitudinal end of the plate 306 is mounted a hemispherical support 314 which is slidably and swivellably movable relative to a row of parallel roller bars 316. There is thus formed a movable revolutionary joint. As shown more clearly in FIGS. 23 and 24, the hemispherical support 314 is engaged with the plate 306 via a mounting frame 318.

Figure 25:
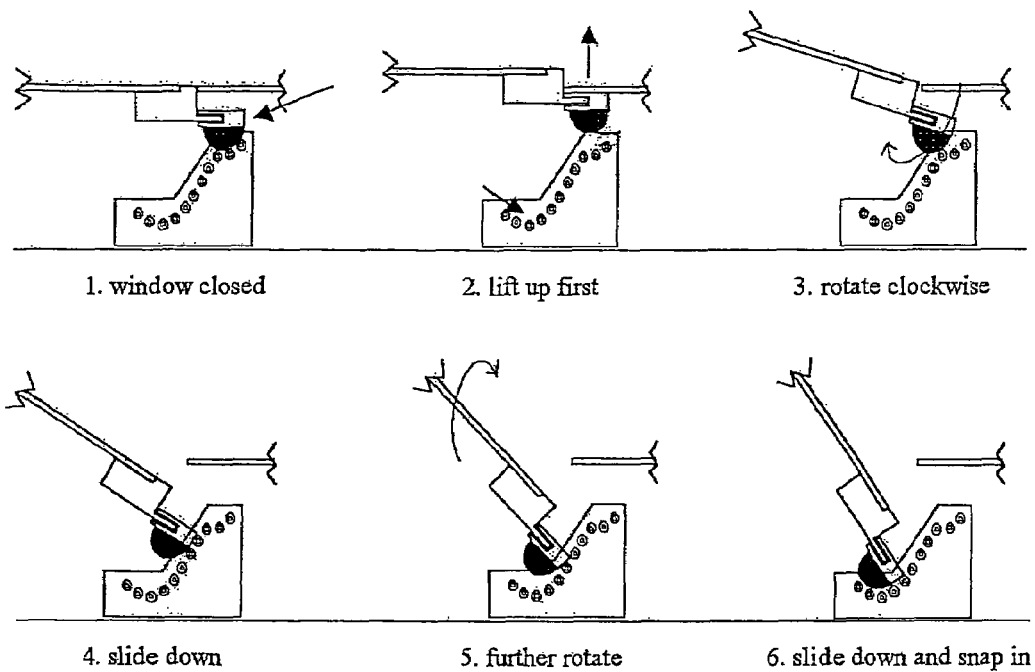
FIG. 25 shows movement of the plate from a closed position to a fully open position.

As shown in FIG. 25, from a window-closed configuration (1), the support 314 is first lifted up above the three topmost roll bars 316 (2), the support 314 is then allowed to move down the row of roller bars 316 (3, 4, 5), thus causing the plate 306 pivot upwardly, until it reaches the lowest point of the path of movement (6). Conversely, by moving the support 314 up the row until it rests on the three topmost roller bars 316, the plate 306 will lie generally flush with the surface 310 of the table 304.

Figure 26:
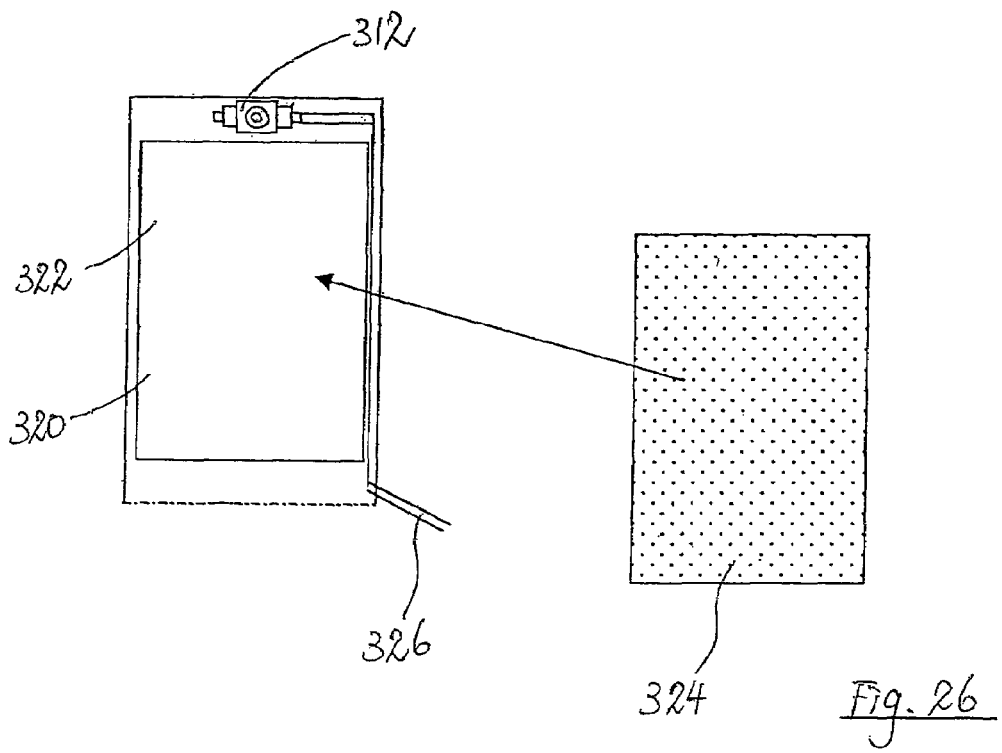
FIG. 26 shows the construction of the semi-transparent plate of a display unit according to the present invention.

As shown in FIG. 26, the plate 306 is made up of a frame 320, which is moulded by a clear plastic material to maximize optical transparency, or at least to minimize visual obstruction. A recess 322 is provided for receiving a semi-transparent film or plate 324. Data from the digital video camera 312 are transmitted by a clear plastic flat cable 326 which runs along a side of the frame 320 to the bottom part.

Figure 27A:
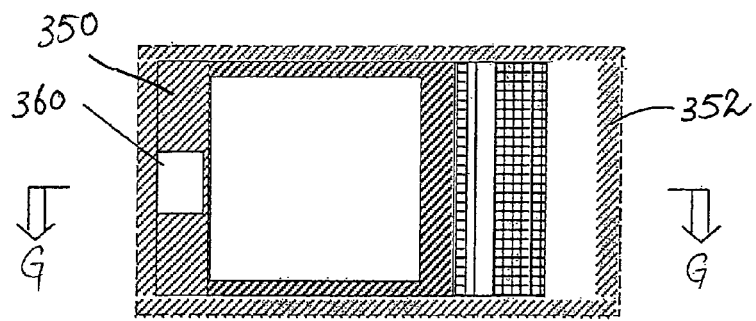
FIG. 27A is a top view of the mounting chassis parts of a further alternative display unit of a display system according to the present invention.
Figure 27B:
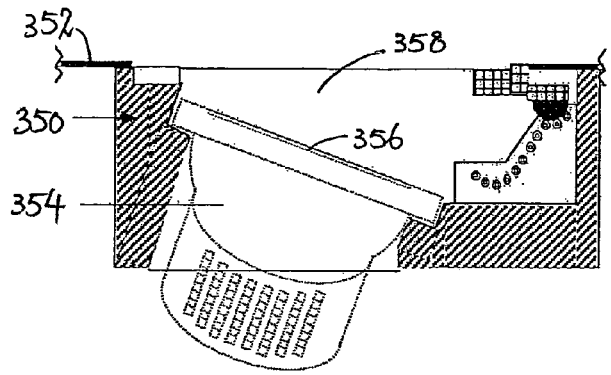
FIG. 27B is a sectional view taken along line G-G of FIG. 27A.

FIGS. 27A and 27B are, respectively, top view and sectional view of the mounting chassis parts of a further alternative display unit of a display system according to the present invention. A metal chassis 350 is mounted beneath a table 352, and is configured to hold a VDU 354 with its screen 356 inclined at around 20° to the horizontal. The part of the chassis 350 facing an opening 358 is dark in colour to reduce light leakage. The chassis 350 is provided with a rectangular hole 360 for accommodating a digital video camera.

Figure 28:
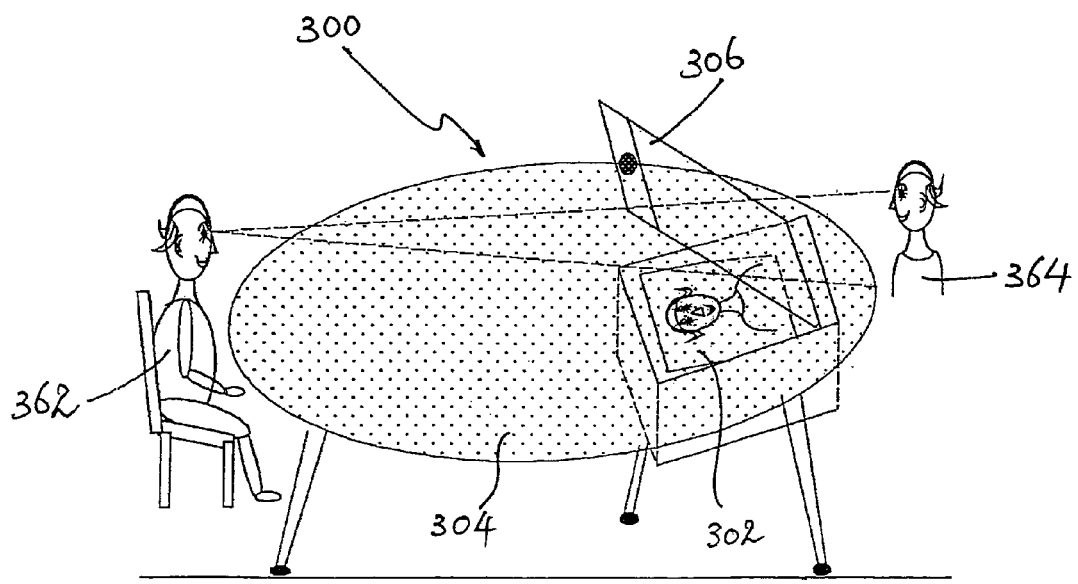
FIG. 28 is a top perspective view showing use of the display system shown in FIGS. 22A to 22F.
Figure 29:
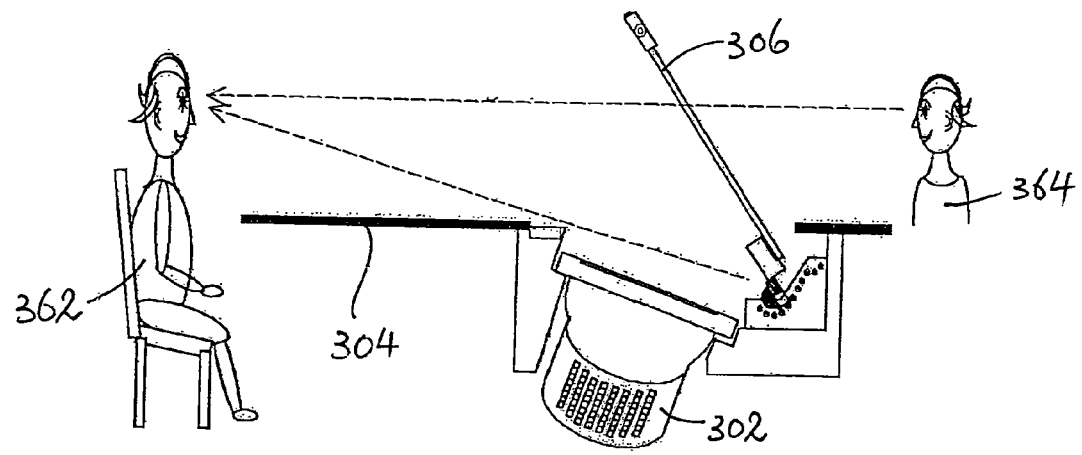
FIG. 29 is a side view of the display system shown in FIG. 28.

FIG. 28 is a top perspective view showing use of the display system 300 shown in FIGS. 22A to 22F, and FIG. 29 is a side view thereof. As shown in FIG. 28, the display unit 300 is installed in the table 304. Image displayed by the VDU 302 is reflected by the slanted semi-transparent plate 306 and perceived by a viewer 362 as virtual image 364.

Figure 30:
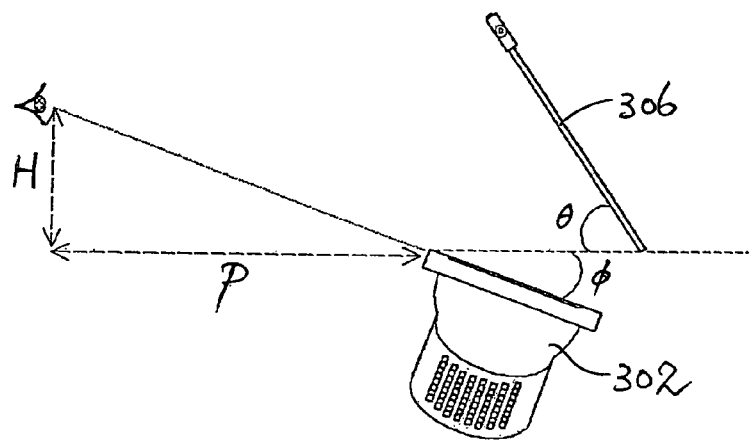
FIG. 30 shows how the angle of inclination of the plate and that of the VDU are calculated.

FIG. 30 shows how the angle of inclination of the plate 306 and that of the VDU 302 are calculated. H is the height of the eye level of the viewer above the surface of the table 304; P is the horizontal distance between the eye of the view and the top edge of the VDU 302; φ is the angle of inclination of the screen of the VDU 302 with respect to the surface of the table 304; and θ is the angle of inclination of the plate 306 with respect to the surface of the table 304. Let's assume here that H is 0.364 m and P is 1 m.

$$\tan\phi = \frac{H}{P}$$
$$= \frac{0.364}{1}$$
$$= 0.364$$
$$\phi = 20°$$

As to θ, it is found that its minimum value $\theta_{min}$ should be:

$$\theta_{min} = 45° + \frac{\phi}{2}$$

Given that φ is found to be 20°, it follows that $\theta_{min}$ is 55°.

FIG. 31 shows the viewer 362 whose image is captured by a digital video camera 370. When the viewer 362 is in the centre position, the image of the viewer 362 as captured in the capture window of the video camera 370 is as shown in frame P1 in FIG. 32; when the viewer 362 moves to her left side, her image in the capture window of the video camera 370 is as shown in frame P2 in FIG. 32; and when the viewer 362 moves to her right side, her image in the capture window of the video camera 370 is as shown in frame P3 in FIG. 32.

Figure 33:
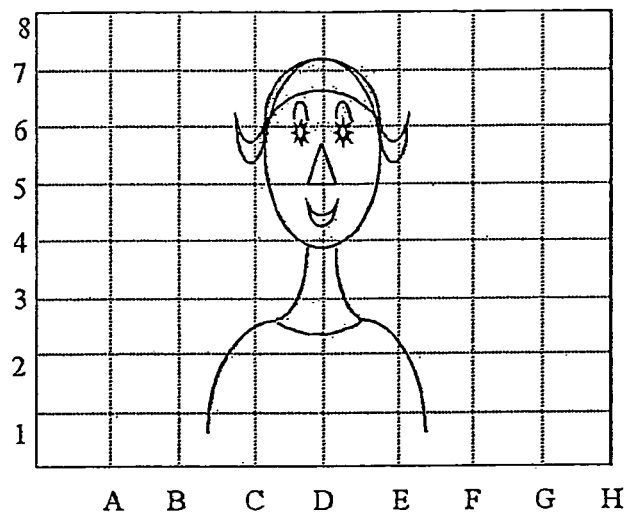
FIG. 33 shows how the head position of the viewer is determined.

FIG. 33 shows how the head position of the viewer is determined. In particular, a simplified face recognition algorithm is used for determining the viewer head position and the centre point between the viewer's two eyes is calculated with respect to the grid position within the capture window. The capture window of the digital video camera 370 thus acts as a reference background against which the position of the head position, or a reference point (e.g. the centre point between the eyes), of the viewer 362 is to be determined and identified. For example, in position P1 in FIG. 32 discussed above, the viewer is recognized as located at D6; in P2, the viewer is recognized as located at F6; and in P3, the viewer is recognized as located at B6. As the viewer moves her head around, e.g. from left to right in real time, a set of data will be recognized as from G6, F6, E6, D6, C6, B6 to A6 eventually.

The same principle applies to vertical movement of the viewer's head. Such information will be transmitted to the control room as real-time data to control the choice of camera to be connected to the display screen at the viewer's site.

Figure 34:
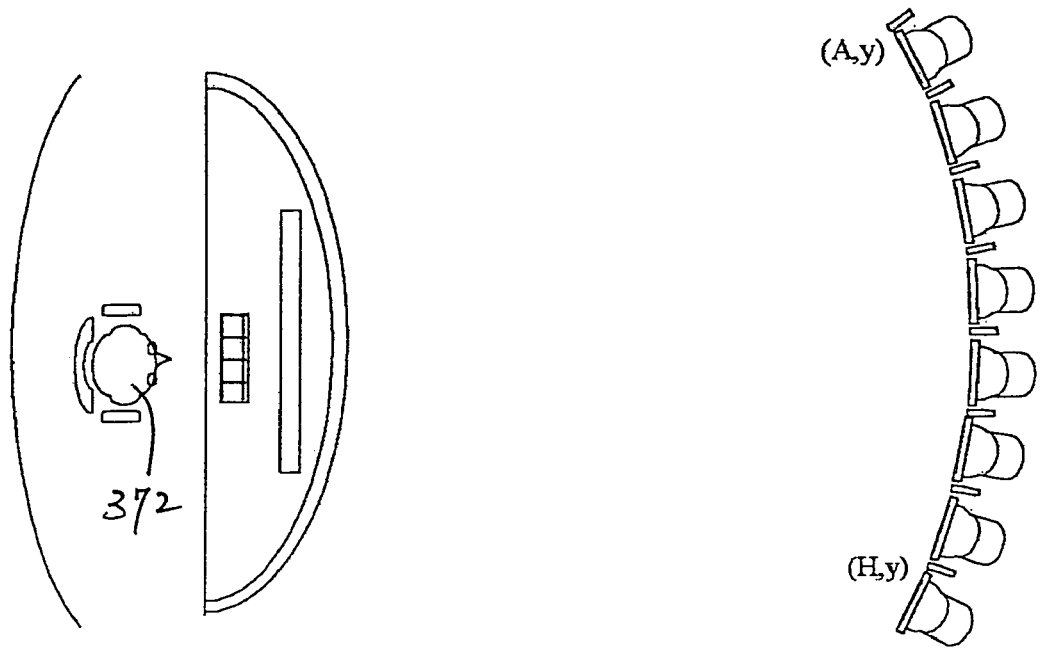
FIG. 34 is a top view of a control room with an array of VDU's.
Figure 35:
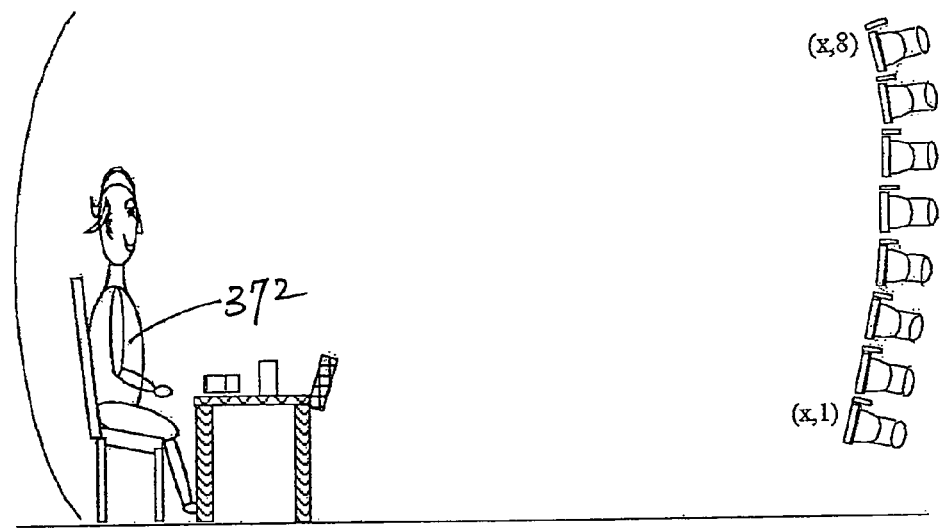
FIG. 35 is a side view of the control room shown in FIG. 34.
Figure 36:
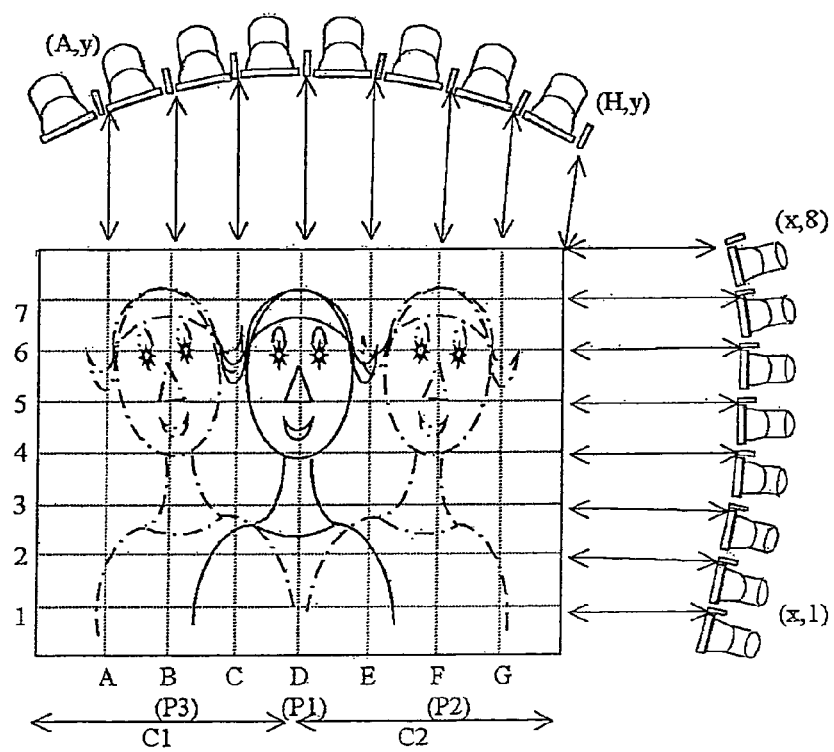
FIG. 36 shows schematically the connection topology of the digital cameras.

For further illustration, FIGS. 34 and 35 show a receptionist 372 sitting in a control room in front of an array of VDU's, and FIG. 36 shows schematically the connection topology of the digital cameras in which C1+C2 is the capture window field of view of the video camera in the viewer site. In this example, when the image of the viewer is at position P1, the viewer is recognized as at D6, the digital camera at the corresponding position (D, 6) in the array of VDU in front of the receptionist 372 will be connected with the VDU at the viewer site; when the image of the viewer is at position P2, the viewer is recognized as at F6, the digital camera at the corresponding position (F, 6) in the array of VDU in front of the receptionist 372 will be connected with the VDU at the viewer site; and when the image of the viewer is at position P3, the viewer is recognized as at B6, the digital camera at the corresponding position (B, 6) in the array of VDU in front of the receptionist 372 will be connected with the VDU at the viewer site.

Figure 37:
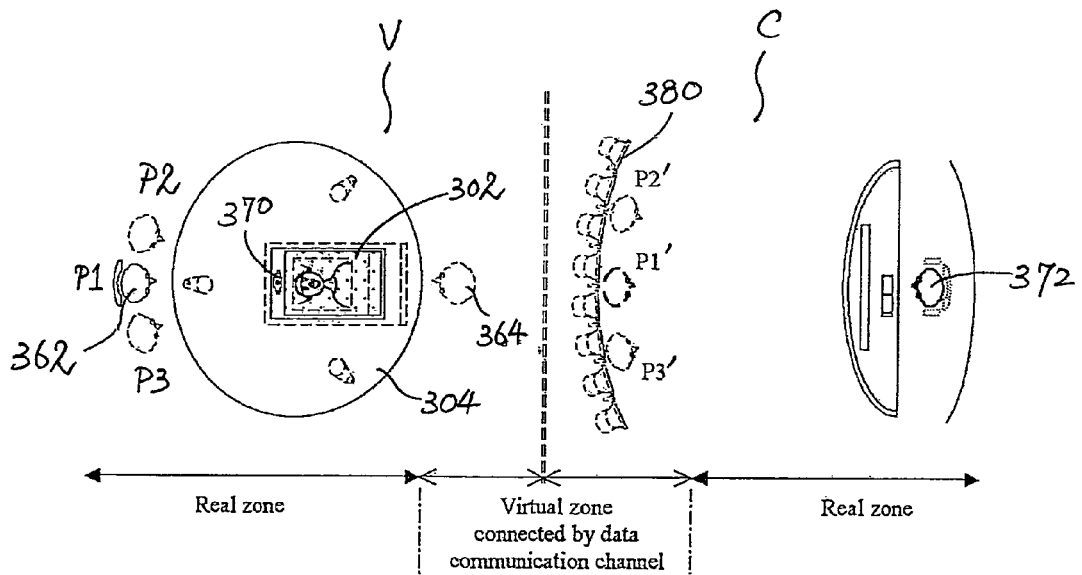
FIG. 37 shows the viewer site and the control room.

The situation may be further illustrated by FIG. 37, which shows both the viewer site V and the control room C. In the viewer site V, the viewer 362 sits in front of a table 304 installed with a display unit according to the present invention, with a VDU 302 displaying image of the receptionist 372 physically located in the control room C, which is geographically remote from the viewer site V. The image of the receptionist 372 is captured by a number of digital video cameras distributed among an array of VDU's 380 in front of the receptionist 372, and the image captured by one of these digital video cameras will be transmitted via a data communication channel for display by the VDU 302 at the viewer site V. The image of the receptionist 372 as displayed by the VDU 302 is reflected by the semi-transparent plate 306 and perceived by the viewer 362 as a virtual image, i.e. a virtual receptionist 364.

Similarly, the image of the viewer 362 is captured by the digital video camera 370 installed at an upper end of the plate 306. The image of the viewer 362 as captured by the digital video camera 370 is displayed on the array of VDU's 380 in front of the receptionist 372. When the viewer 362 is at the position P1 in the viewer site V, he/she will be recognized as being at the D6 position, his/her image will be displayed at position P1' in the array of VDU's 380 in the control room C. Data representing "D6" will be transmitted via the data communication channel to the control system in the control room, thus activating the video camera at position (D, 6) in the array of VDU's 380. This particular video camera will then be connected with the VDU 302 at the viewer site V, and it is the image of the receptionist 372 as captured by this video camera which will be transmitted via the data communication channel for display by the VDU 302 at the viewer site V, as mentioned above.

When the viewer 362 moves to position P2 in the viewer site V, his/her image as captured by the capture window of the digital video camera 370 will be as shown in the dotted line as P2 in FIG. 36, in which the centre point between the viewer's two eyes is recognized as being at F6. The viewer's image will be displayed at position P2' in the VDU array 380. Data representing "F6" will be transmitted via the data communication channel to the control system in the control room, thus activating the video camera at position (F, 6) in the array of VDU's 380. This particular video camera will then be connected with the VDU 302 at the viewer site V, and it is the image of the receptionist 372 as captured by this video camera which will be transmitted via the data communication channel for display by the VDU 302 at the viewer site V, as mentioned above.

Similarly, when the viewer 362 moves to position P3 in the viewer site V, his/her image as captured by the capture window of the digital video camera 370 will be as shown in the dotted line as P3 in FIG. 36, in which the centre point between the viewer's two eyes is recognized as being at B6. The viewer's image will be displayed at position P3' in the VDU array 380. Data representing "B6" will be transmitted via the data communication channel to the control system in the control room, thus activating the video camera at position (B, 6) in the array of VDU's 380. This particular video camera will then be connected with the VDU 302 at the viewer site V, and it is the image of the receptionist 372 as captured by this video camera which will be transmitted via the data communication channel for display by the VDU 302 at the viewer site V, as mentioned above.

Figure 38:
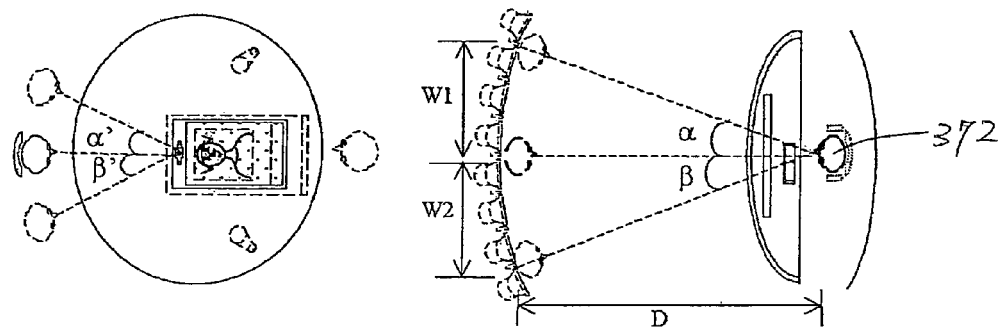
FIG. 38 shows the same viewer site and control room as in FIG. 37, but for illustrating the determination of viewing angles.

FIG. 38 shows the same viewer site V and control room C as in FIG. 37, but for the purpose of illustrating the determination of viewing angles, where W1 is the horizontal distance from the digital video camera in the VDU array 380 to the last digital video camera at one end, W2 is the horizontal distance from the digital video camera in the VDU array 380 to the last digital video camera at another end, and D is the average distance between the array of video cameras to the receptionist 372.

$$\alpha = \tan \frac{W1}{D}$$

and $$\beta = \tan \frac{W2}{D}$$

In case where there is an odd number of video cameras in each row and they are evenly spaced out, W1=W2, thus α=β.

Figure 39:
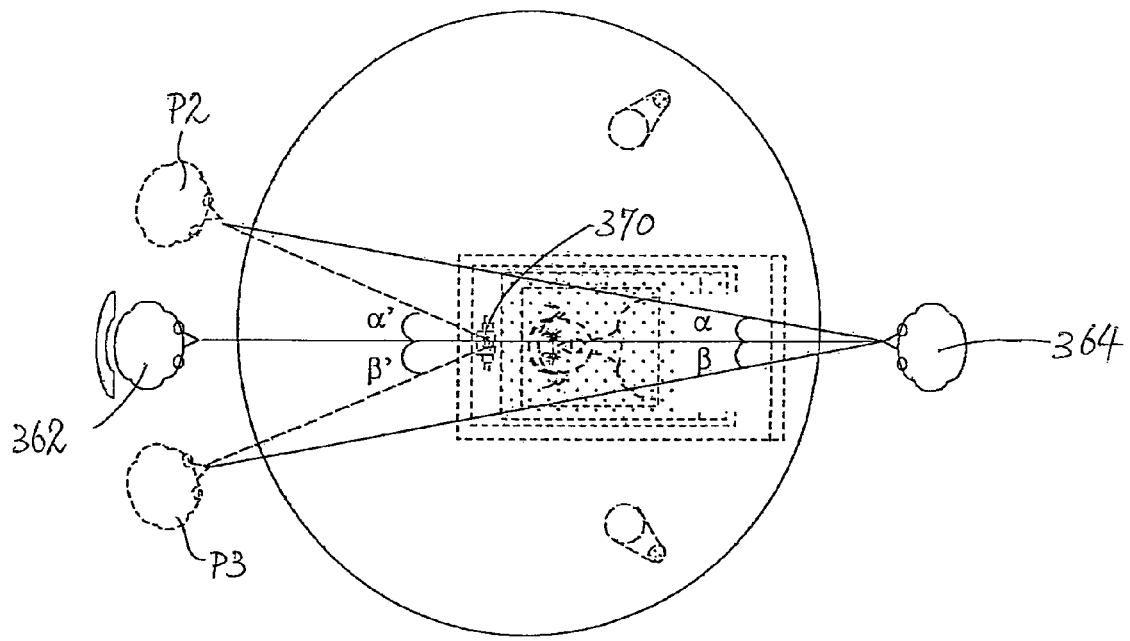
FIG. 39 is a top view of an e-Receptionist application of a display unit according to the present invention.
Figure 40:
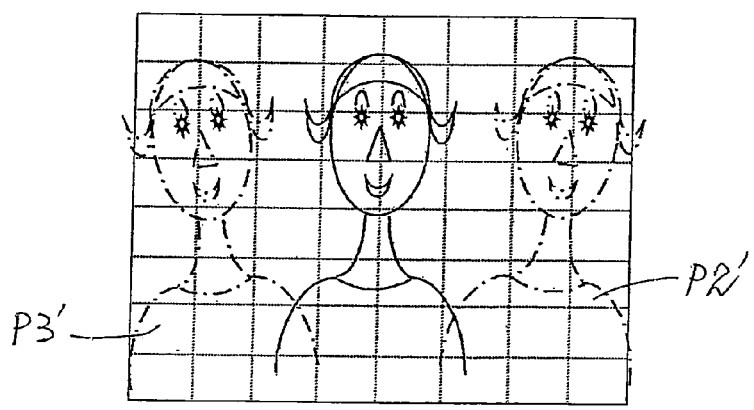
FIG. 40 shows various views of the viewer when captured in the capture window of the digital video camera in FIG. 39.

Turning now to FIG. 39, by way of the aforesaid arrangement, when the viewer 362 moves his/her head to the left to position P2 by an angle of α with respect to the virtual image 364 of the receptionist 372, his/her image will be as shown P2' in FIG. 40, and when the viewer 362 moves his/her head to the right to position P3 by an angle of β with respect to the virtual image 364 of the receptionist 372, his/her image will be as shown P3' in FIG. 40. When the viewer 362 is at position P2, he/she is sidewardly disposed relative to the video camera 370 by an angle α', and when the viewer 362 is at position P3, he/she is sidewardly disposed relative to the video camera 370 by an angle β'. With a maximum angle of field of view of α+β, the maximum angle of capture of the camera capture window α'+β' should be correlated with the angle α+β.

Figure 41:
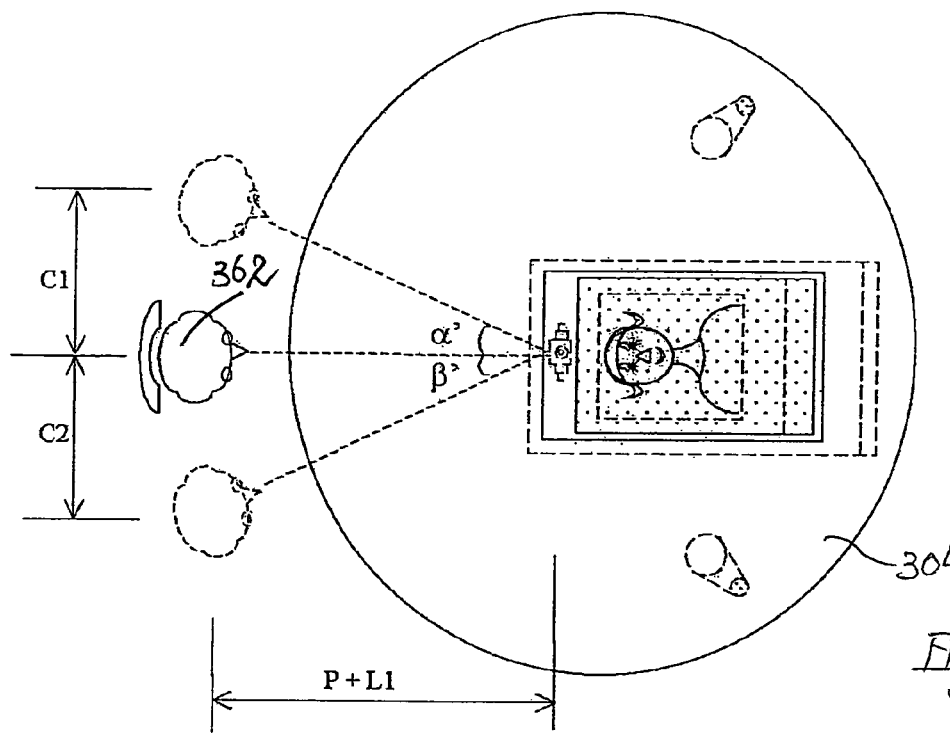
FIG. 41 is a top view of an e-Receptionist application of a display unit according to the present invention.
Figure 42:
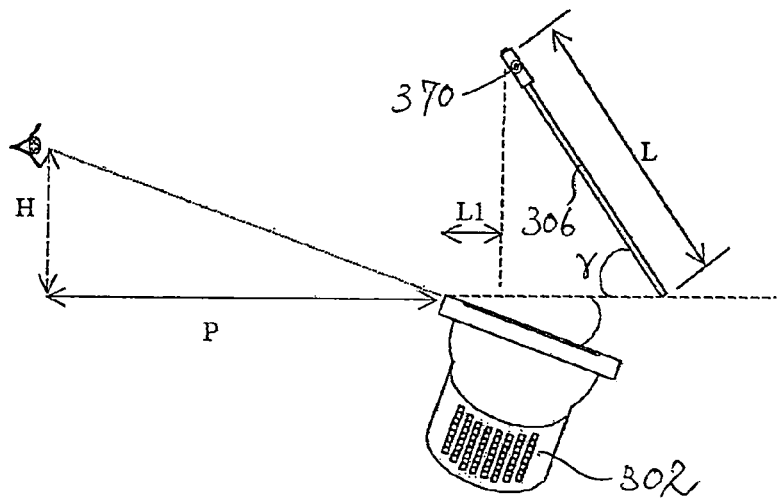
FIG. 42 is a simplified side view of FIG. 41.

In FIGS. 41 and 42:

C1+C2 is approximate capture window field of view;

P is the horizontal distance between the eyes of the viewer 362 and the top edge of the VDU 302;

γ is the angle of inclination of the semi-transparent plate 306 with respect to the top surface of the table 304;

L is the length of the plate 306; and

L1 is the horizontal distance between the digital video camera 370 and the top edge of the VDU 302. It is assumed here that L1≈L (1−cos γ).

Given the above:

$$C1 + C2 = (P + L1)(\tan\alpha' + \tan\beta')$$
$$= [P + L(1 - \cos\gamma)](\tan\alpha' + \tan\beta')$$

Figure 43:
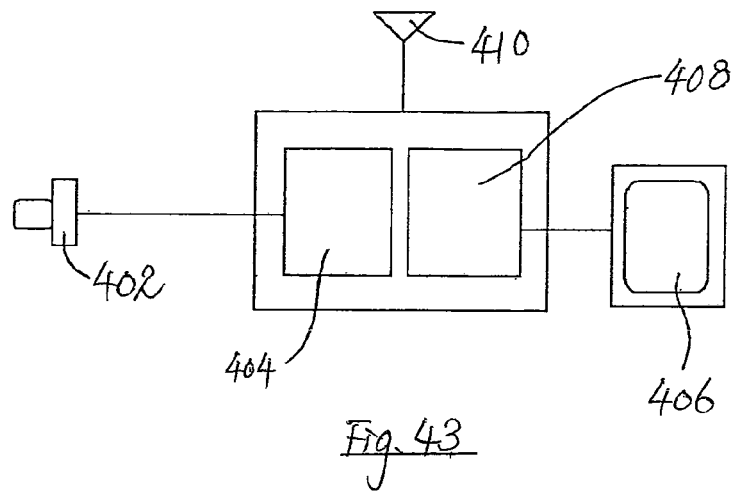
FIG. 43 shows a simplified architecture of a 3G mobile phone.

A simplified architecture of a 3G mobile phone is shown in FIG. 43, as comprising a digital camera 402 connected with a video buffer (camera) 404, a display screen 406 connected with a video buffer (screen) 408, and an antenna 410 for receiving and transmitting signals for communication with other mobile phones via the communication network of a service provider. Signals captured by the digital camera 402 are stored in the a video buffer (camera) 404, corresponding to a segment of memory mapped onto the system data memory. Data stored in the screen video buffer 408 are mapped on the screen 406 for display of the content.

Figure 44:
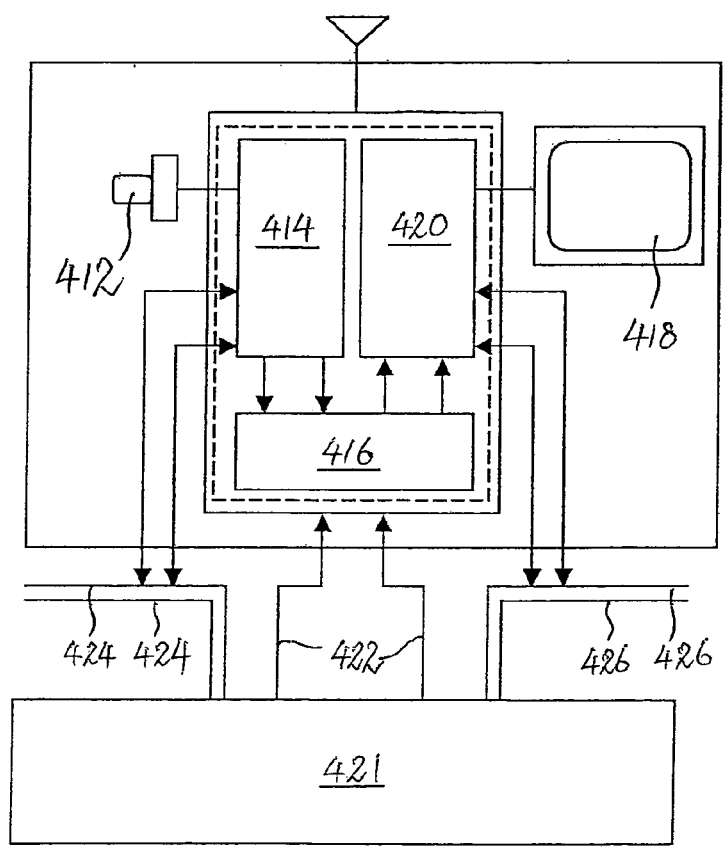
FIG. 44 shows a video wall module of a display system according to the present invention, adopting a modified 3G mobile phone architecture.

By modification of the video memory interface, a typical 3G mobile phone architecture can be applied in a VDU array. FIG. 44 shows a video wall module (VWM) forming part of a VDU array in a control room setting. A digital video camera 412 is connected with a video buffer (camera) dual port access memory 414, which is in turn connected with an internal central processing unit (CPU) 416. A display screen 418 is connected with a video buffer (screen) dual port access memory 420, which is also with the CPU 416. A video memory management unit (VMMU) 421 is connected with the CPU 416 via video memory control bus 422, with the video buffer (camera) dual port access memory 414 via camera data bus 424, and with the video buffer (screen) dual port access memory 420 via screen data bus 426

Figure 45:
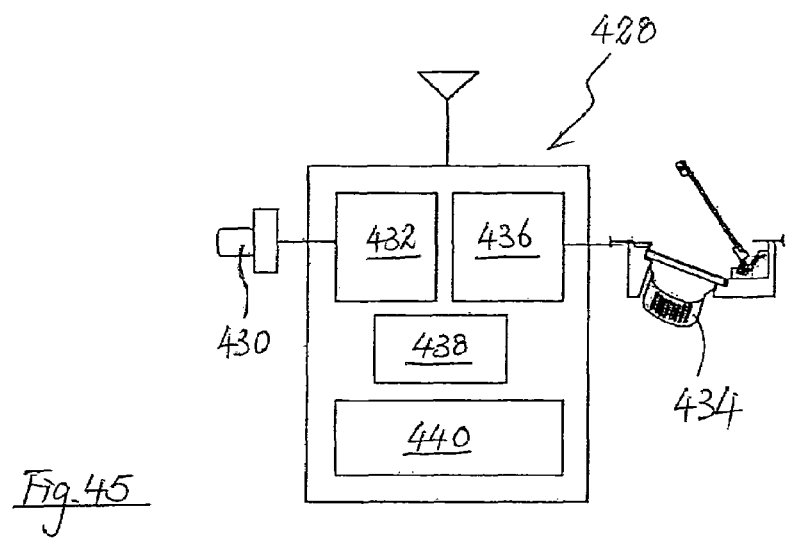
FIG. 45 shows the use of a 3G mobile phone as part of display unit of a viewer site.

FIG. 45 shows the use of a 3G mobile phone 428 as part of a remote site module (RSM) of a display system according to the present invention. An on-site video camera 430 is connected with a video buffer (camera) 432. An VDU 434 housed in a display unit as previously discussed is connected with a video buffer (screen) 436 of the mobile phone 428. In addition to an internal CPU 438 for controlling the operation of the mobile phone 428, there is also provided a face recognition module 440 in the operating system.

Figure 46:
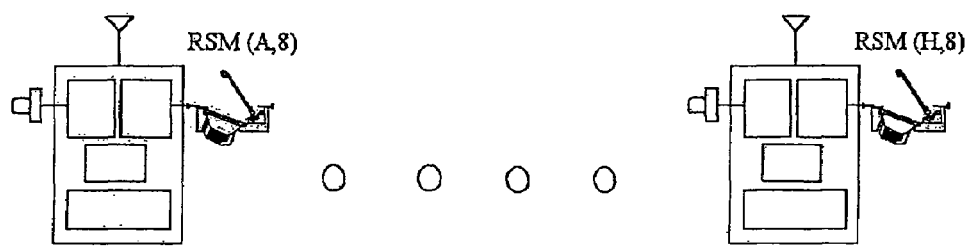
FIG. 46 shows various remote site modules distributed at geographically remote locations.
Figure 46:
Figure 46:
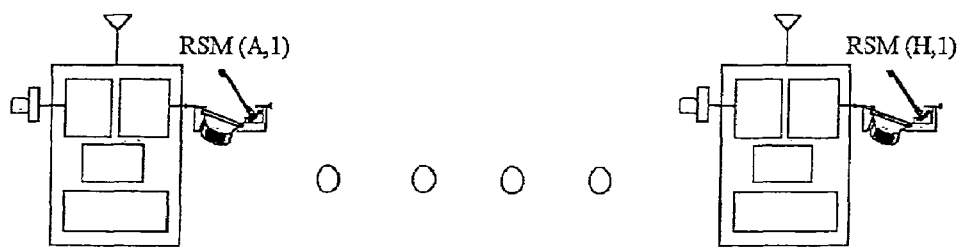
Figure 47:
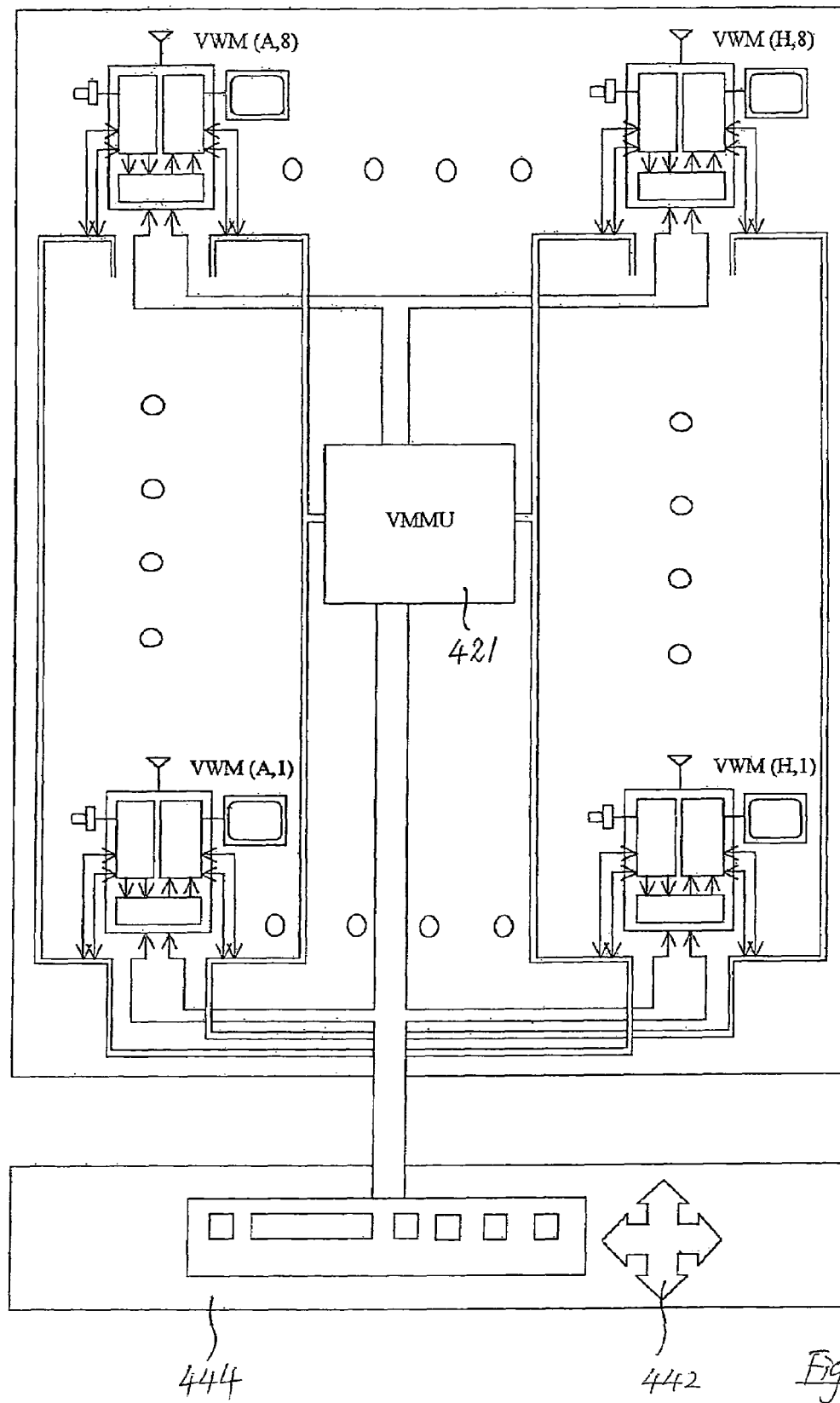
FIG. 47 shows an array of video wall modules (VWM's) forming an array of VDU's and digital video cameras.

As shown in FIGS. 46 and 47, the VMMU 421 controls the video data memory flow from the RSM's (A, 1; . . . H, 8) to each VWM in the control room (A, 1; . . . H, 8). In the "discrete" mode of operation, the VMMU 421 sends signals to each RSM to request a page of the video image captured by its respective on-site video camera 430. Upon receipt of the request, each RSM starts to determine if is any viewer in front of its camera 430. If so, the RSM will reply to the VMMU 421 by sending the viewer head position data and the captured image of the viewer; if not, only signals representing the background image will be transmitted to the VMMU 421 as a reply to the request. The VMMU 421 will then direct this page from the RSM's to the respective corresponding VWM on the array of VDU's in the control room. The video camera associated with the respective VWM will also be activated to capture the face of the receptionist in the control room for transmission back to the RSM display screen. These steps are carried out for all RSM's and VWM's concurrently. It is a one-to-one mapping in the "discrete" mode, and acts similarly to a pair of 3G mobile phones in operation and communication with each other.

The master receptionist in the control room looks at the array of VDU's and starts searching each VWM display with its corresponding contents from the respective on-site video camera. By manipulating a cursor pad 442 on a control panel

444, the master receptionist can select any one of the VWM's in the VDU array to be the active VWM.

It is also possible to switch to the "integrated" mode of operation, in which all the VWM's (say sixty-four of them) will be combined to form a single big screen for displaying the image from the active RSM. In this mode, eye-contact can take place during communication between the master receptionist and the viewer at the active RSM. The active RSM will continuously send viewer head position data stream information to the VMMU 421 for determining the video camera among the array of VDU's to be activated for sending images of the receptionist captured by it to the display of the active RSM.

It should be understood that the above only illustrates examples whereby the present invention may be carried out, and that various modifications and/or alterations may be made thereto without departing from the spirit of the invention.

It should also be understood that certain features of the invention, which are, for clarity, described in the context of separate embodiments, may be provided in combination in a single embodiment. Conversely, various features of the invention which are, for brevity, described in the context of a single embodiment, may also be provided separately or in any appropriate sub-combinations.

What is claimed is:

1. A display system including:
   at least first and second visual display means (VDM's), each being adapted to display at least one visual image for viewing;
   at least a first image capturing device adapted to capture at least one image of a first individual viewing said first VDM;
   at least second and third image capturing devices each adapted to capture, each from a different angle, at least one image of a second individual viewing said second VDM;
   wherein said first image capturing device is connectable with said second VDM for transmitting said captured image to said second VDM for display;
   wherein said first VDM is connectable with either of said second and third image capturing devices for display of said image captured by either of said second and third image capturing devices;
   means for identifying the position of a reference point of the captured image of said first individual against a pre-determined reference background; and
   means for selectively connecting said first VDM with said second image capturing device or said third image capturing device in accordance with the position of said reference point of said first individual as identified by said identifying means.

2. A system according to claim 1 wherein said image capturing devices are digital cameras.

3. A system according to claim 1 wherein said image capturing devices are digital video cameras.

4. A system according to claim 1 wherein said reference point is the centre point between the eyes of said first individual.

5. A system according to claim 1 wherein said pre-determined reference background is an image capture window of said first image capturing device.

6. A system according to claim 1 wherein said first VDM includes a visual display unit (VDU) and a reflector adapted to reflect said image displayed by said VDU for viewing by said first individual.

7. A system according to claim 6 wherein said reflector is semi-transparent.

8. A system according to claim 6 wherein said first image capturing device is engaged with said reflector.

9. A system according to claim 6 wherein said reflector is movable relative to said VDU.

10. A system according to claim 9 wherein said reflector is movable between a first position in which said reflector substantially closes a container housing said VDU and a second position in which said reflector is inclined relative to a screen of said VDU.

11. A system according to claim 1 wherein said second VDM comprises a plurality of visual display units (VDU's).

12. A system according to claim 11 wherein each of said plurality of VDU's is adapted to display images captured by a respective image capturing device.

13. A system according to claim 11 wherein said plurality of VDU's are adapted to collectively display images captured by said first image capturing device.

14. A system according to claim 11 wherein a plurality of image capturing devices are distributed amongst said plurality of VDU's, each said image capturing device being adapted to capture images of said second individual from a different angle.

15. A system according to claim 14 wherein said plurality of image capturing devices are evenly distributed amongst said plurality of VDU's.

16. A system according to claim 14 wherein when said plurality of VDU's of said VDM collectively display images captured by said first image capturing device, the image capturing device associated with the VDU of the VDM which is closest to the reference point of the first individual as collectively displayed by said VDM is connected with said first VDM.

17. A system according to claim 11 further including means for selecting one of said VDU's as an active VDU.

18. A system according to claim 17 wherein images displayed by said active VDU are of a higher quality that the images displayed by the remaining VDU's.

19. A system according to claim 18 wherein the images displayed by said active VDU are in colours, and the images displayed by the remaining VDU's are in black and white.

20. A system according to claim 1 wherein said first VDM includes at least a 3G mobile phone connected with a VDU.

21. A system according to claim 1 wherein said second VDM includes at least a 3G mobile phone connected with a VDU.

22. A display method, including the steps of:
   (a) capturing at least one image of a first individual;
   (b) displaying the captured image of said first individual to a second individual;
   (c) capturing images of said second individual from at least a first angle and a second angle which are different from each other;
   (d) identifying the position of a reference point of the captured image of said first individual against a pre-determined reference background; and
   (e) selectively displaying the image captured from said first angle or from said second angle, in accordance with the identified position of said reference point of said first individual.

23. A method according to claim 22 wherein said steps (a) and (c) are carried out by image capturing devices.

24. A method according to claim 23 wherein said image capturing devices are digital cameras.

25. A method according to claim 23 wherein said image capturing devices are digital video cameras.

26. A method according to claim 22 wherein said reference point is the centre point between the eyes of said first individual.

27. A method according to claim 22 wherein said pre-determined reference background is an image capture window of said first image capturing device.

28. A method according to claim 22 wherein said step (e) is carried out by a first VDM.

29. A method according to claim 28 wherein said first VDM includes a visual display unit (VDU) and a reflector adapted to reflect images displayed by said VDU for viewing by said first individual.

30. A method according to claim 29 wherein said reflector is semi-transparent.

31. A method according to claim 22 wherein said step (b) is carried out by a second VDM.

32. A method according to claim 31 wherein said second VDM comprises a plurality of visual display units (VDU's).

33. A method according to claim 32 wherein each of said plurality of VDU's displays images captured by a respective image capturing device.

34. A method according to claim 32 wherein said plurality of VDU's collectively display the captured image of said first individual.

35. A method according to claim 32 including a step (f) of distributing a plurality of image capturing devices amongst said plurality of VDU's, each said image capturing device being adapted to capture at least an image of said second individual from a different angle.

36. A method according to claim 35 wherein said plurality of image capturing devices are evenly distributed amongst said plurality of VDU's.

37. A method according to claim 35 including a step (g) of connecting said first VDM with the image capturing device associated with the VDU of the second VDM which is closest to the reference point of the first individual as collectively displayed by said second VDM.

38. A method according to claim 32 further including a step (h) of selecting one of said VDU's of said second VDM as an active VDU.

39. A method according to claim 38 further including a step (i) of said active VDU displaying images of a higher quality that those displayed by the remaining VDU's.

40. A method according to claim 39 wherein in said step (i), said active VDU displays images in colours, and the remaining VDU's display images in black and white.

41. A method according to claim 22 wherein said first VDM includes at least a 3G mobile phone connected with a VDU.

42. A method according to claim 22 wherein said second VDM includes at least a 3G mobile phone connected with a VDU.

* * * * *